United States Patent
Frolov et al.

(10) Patent No.: US 10,040,553 B2
(45) Date of Patent: Aug. 7, 2018

(54) VERTICAL TAKE-OFF AND LANDING DETACHABLE CARRIER AND SYSTEM FOR AIRBORNE AND GROUND TRANSPORTATION

(71) Applicant: SUNLIGHT PHOTONICS INC., Edison, NJ (US)

(72) Inventors: Sergey V. Frolov, New Providence, NJ (US); Michael Cyrus, Castle Rock, CO (US); John Peter Moussouris, Palo Alto, CA (US)

(73) Assignee: SUNLIGHT PHOTONICS INC., Edison, NJ (US)

( * ) Notice: Subject to any disclaimer, the term of this patent is extended or adjusted under 35 U.S.C. 154(b) by 0 days.

(21) Appl. No.: 15/620,178

(22) Filed: Jun. 12, 2017

(65) Prior Publication Data
US 2017/0274996 A1 Sep. 28, 2017

Related U.S. Application Data

(63) Continuation of application No. 15/252,297, filed on Aug. 31, 2016, now Pat. No. 9,714,090, which is a
(Continued)

(51) Int. Cl.
*B64C 39/02* (2006.01)
*B64C 29/00* (2006.01)
(Continued)

(52) U.S. Cl.
CPC ........ *B64C 39/024* (2013.01); *B64C 29/0025* (2013.01); *B64C 39/10* (2013.01);
(Continued)

(58) Field of Classification Search
CPC ............ B64C 29/0025; B64C 29/0033; B64C 29/005; B64C 29/0075; B64C 37/00;
(Continued)

(56) References Cited

U.S. PATENT DOCUMENTS

| 1,783,458 A | 12/1930 | Windsor |
| 1,961,214 A * | 6/1934 | Hall ...................... B64C 11/001 415/130 |

(Continued)

FOREIGN PATENT DOCUMENTS

| GB | 2476149 A | 6/2011 |
| WO | WO 2008/018857 A2 | 2/2008 |
| WO | WO 2014/021798 A2 | 2/2014 |

OTHER PUBLICATIONS

Fierro et al, On Controlling Aircraft Formations, Proceedings of the 40th IEEE Conference on Decision and Control, 2001, pp. 1065-1070.

(Continued)

*Primary Examiner* — Joseph W Sanderson
(74) *Attorney, Agent, or Firm* — Moser Taboada; Alan Taboada

(57) ABSTRACT

An aircraft assembly includes at least one first wing portion providing a lift force during a horizontal flight, at least one wing opening disposed on a vertical axis of the at least one first wing portion, at least one vertical thruster positioned inside the at least one wing opening to provide vertical thrust during a vertical flight, and a mounting system including an open frame portion in a frame of the aircraft and at least one attachment member disposed in the open frame portion to attach at least one pod to the open frame portion in the aircraft frame. The aircraft assembly can further include at least one pod including a mounting frame to attach to the mounting system and a cabin to contain at least one of cargo and passengers.

29 Claims, 18 Drawing Sheets

Related U.S. Application Data continuation-in-part of application No. 14/737,814, filed on Jun. 12, 2015, now Pat. No. 9,541,924.

(51) Int. Cl.

| | |
|---|---|
| *B64D 9/00* | (2006.01) |
| *G08G 7/02* | (2006.01) |
| *G05D 1/00* | (2006.01) |
| *G05D 1/06* | (2006.01) |
| *G05D 1/10* | (2006.01) |
| *G08G 5/00* | (2006.01) |
| *B64C 39/10* | (2006.01) |
| *G05D 1/02* | (2006.01) |
| *G08G 5/02* | (2006.01) |
| *G08G 5/04* | (2006.01) |

(52) U.S. Cl.
CPC .............. *B64D 9/00* (2013.01); *G05D 1/005* (2013.01); *G05D 1/0022* (2013.01); *G05D 1/0027* (2013.01); *G05D 1/0212* (2013.01); *G05D 1/0669* (2013.01); *G05D 1/102* (2013.01); *G05D 1/104* (2013.01); *G08G 5/0008* (2013.01); *G08G 5/0013* (2013.01); *G08G 5/0021* (2013.01); *G08G 5/0065* (2013.01); *G08G 5/0069* (2013.01); *G08G 5/025* (2013.01); *G08G 7/02* (2013.01); *B64C 2201/021* (2013.01); *B64C 2201/088* (2013.01); *B64C 2201/128* (2013.01); *B64C 2201/143* (2013.01); *B64C 2211/00* (2013.01); *G08G 5/045* (2013.01); *Y02T 50/12* (2013.01)

(58) Field of Classification Search
CPC ........ B64C 2201/088; B64C 2201/108; B64C 2211/00; B60F 5/02
USPC .......................................................... 415/91
See application file for complete search history.

(56) References Cited

U.S. PATENT DOCUMENTS

| | | | |
|---|---|---|---|
| 2,388,380 A | | 11/1945 | Bathurst |
| 2,509,442 A | | 5/1950 | Matheisel |
| 2,714,309 A | | 8/1955 | Redemske |
| 2,930,544 A | | 3/1960 | Howell |
| 2,973,166 A | | 2/1961 | Stahmer |
| 2,997,015 A | * | 8/1961 | Richter .................... B63H 5/14 |
| | | | 415/124.1 |
| 3,028,130 A | * | 4/1962 | Burton ..................... B64D 9/00 |
| | | | 244/118.2 |
| 3,179,353 A | | 4/1965 | Peterson |
| 3,273,339 A | | 9/1966 | Borysthen-Tkacz |
| 3,486,719 A | * | 12/1969 | Bock .......................... B64B 1/00 |
| | | | 244/125 |
| 3,573,818 A | | 4/1971 | Lennon |
| 4,674,710 A | | 6/1987 | Rodriguez |
| 4,706,198 A | | 11/1987 | Thurman |
| 5,312,069 A | | 5/1994 | Bollinger et al. |
| 5,320,305 A | | 6/1994 | Oatway et al. |
| 5,842,667 A | * | 12/1998 | Jones .................. B64C 29/0025 |
| | | | 244/114 R |
| 6,086,014 A | | 7/2000 | Bragg, Jr. |
| 6,561,456 B1 | | 5/2003 | Devine |
| 6,565,321 B1 | * | 5/2003 | Illingworth ........... B64C 11/001 |
| | | | 416/185 |
| 6,843,447 B2 | | 1/2005 | Morgan |
| 6,963,795 B2 | | 11/2005 | Haissig |
| 7,006,032 B2 | | 2/2006 | King |
| 7,267,300 B2 | | 9/2007 | Heath |
| 7,410,122 B2 | | 8/2008 | Robbins et al. |
| 7,793,888 B2 | | 9/2010 | Padan |
| 7,975,958 B2 | | 7/2011 | Sommer |
| 8,016,226 B1 | | 9/2011 | Wood |
| 8,636,241 B2 | | 1/2014 | Lugg |
| 8,897,770 B1 | | 11/2014 | Frolov |
| 8,936,212 B1 | | 1/2015 | Fu |
| 8,983,455 B1 | | 3/2015 | Frolov |
| 8,991,741 B2 | | 3/2015 | Wang |
| 9,022,312 B2 | * | 5/2015 | Kosheleff ............... B64F 1/007 |
| | | | 244/12.1 |
| 9,284,058 B2 | | 3/2016 | Wang |
| 9,610,817 B1 | * | 4/2017 | Piasecki ................. G05D 1/102 |
| 9,714,090 B2 | * | 7/2017 | Frolov ................. G08G 5/0021 |
| 2003/0085319 A1 | | 5/2003 | Wagner et al. |
| 2004/0245374 A1 | * | 12/2004 | Morgan .............. B64C 29/0025 |
| | | | 244/12.3 |
| 2005/0165516 A1 | | 7/2005 | Haissig |
| 2005/0230563 A1 | | 10/2005 | Corcoran |
| 2006/0113425 A1 | | 6/2006 | Rader |
| 2006/0192046 A1 | | 8/2006 | Heath |
| 2007/0132638 A1 | | 6/2007 | Frazier |
| 2007/0188850 A1 | | 8/2007 | Chi |
| 2007/0246601 A1 | | 10/2007 | Layton |
| 2008/0169375 A1 | | 7/2008 | Ishikawa |
| 2008/0296428 A1 | | 12/2008 | Reinhardt |
| 2011/0315806 A1 | * | 12/2011 | Piasecki ................. G05D 1/102 |
| | | | 244/2 |
| 2012/0048990 A1 | | 3/2012 | Sommer |
| 2012/0213636 A1 | * | 8/2012 | Gallant ................. F03D 1/0625 |
| | | | 416/182 |
| 2012/0280091 A1 | | 11/2012 | Saiz |
| 2013/0062455 A1 | | 3/2013 | Lugg |
| 2013/0251525 A1 | | 9/2013 | Saiz |
| 2013/0315806 A1 | | 11/2013 | Seong et al. |
| 2014/0151502 A1 | * | 6/2014 | Kosheleff ............... B64F 1/007 |
| | | | 244/114 R |
| 2016/0009387 A1 | | 1/2016 | Kummer et al. |
| 2016/0054735 A1 | * | 2/2016 | Switkes .................... G08G 1/22 |
| | | | 701/23 |
| 2016/0159458 A1 | * | 6/2016 | Linch .................... B64C 39/024 |
| | | | 416/175 |

OTHER PUBLICATIONS

H.P. Thien, M.A. Moelyadi, H. Muhammad, "Effects of Leaders Position and Shape on Aerodynamic Performances of V Flight Formation", Proceedings of the International Conference on Intelligent Unmanned System (ICIUS 2007), Bali, Indonesia, Oct. 24-25, 2007, pp. 43-49.

Wang et al, Controllability Properties for Aircraft Formations, 49th IEEE Conference on Decision and Control, Dec. 2010, pp. 2047-2054.

Jiang et al, Investigation of Dynamic Characteristic of Forward Swept Folding Wing, Proceeding of the IEEE International Conference on Automation and Logistics, Aug. 2011, pp. 225-228.

Kim et al, Development of Multiple Unmanned Aircraft System and Flight Experiment, IEEE, 2015 International Conference on Unmanned Aircraft Systems, Jun. 2015, pp. 551-558.

International Search Report and Written Opinion dated Dec. 6, 2016 for PCT Application No. PCT/US2016/03 7074.

Extended European Search Report received for EP Application No. EP 17 18 8895 dated Nov. 13, 2017.

\* cited by examiner

VERTICAL TAKE-OFF AND LANDING DETACHABLE CARRIER AND SYSTEM FOR AIRBORNE AND GROUND TRANSPORTATION

CROSS-REFERENCE TO RELATED APPLICATIONS

This application is a continuation of co-pending U.S. patent application Ser. No. 15/252,297, filed Aug. 31, 2016 which is a continuation-in-part of issued U.S. Pat. No. 9,541,924, issued Jan. 10, 2017, which are herein incorporated by reference in their entirety.

FIELD

Embodiments of the present invention generally relate to an aircraft and methods for vertical take-off and landing (VTOL) for application in at least airborne transportation and other applications, and in particular to those for enabling massively scalable modular transportation of passengers and cargo based on vertical take-off and landing of airborne vehicles.

BACKGROUND

Modern airborne transportation is primarily based on large size fixed-wing aircraft that can transport relatively large number of passengers and amount of cargo between a limited number of airports, which are areas specially created for take-off and landing of regular aircraft. As a result, such a transportation system is limited in its abilities to remain economical and provide adequate services under increasing demands for faster, better and more reliable performance. Airports represent one of the most apparent bottlenecks in this system. They are expensive to operate for owners and inconvenient to use for customers. Existing airports are being utilized at close to capacity and additional ones are not built fast enough.

Existing airborne transportation systems are in many ways similar to ground-based centralized systems for public and mass transportation, well-known examples of which are ones based on railroad and highway bus transport. Such systems lack the flexibility and convenience of a distributed transportation system, such as for example a taxicab transportation service.

Therefore, the inventors have provided an improved airborne transportation system, which provides one or more benefits of distributed transportation.

SUMMARY

Embodiments of the present invention generally relate to an aircraft for vertical take-off and landing.

In one embodiment of the present invention, an aircraft for vertical take-off and landing includes at least one first wing portion providing a lift force during a horizontal flight, at least one wing opening disposed on a vertical axis of the at least one first wing portion and at least one propeller positioned inside the at least one wing opening to provide vertical thrust during a vertical flight.

In an alternate embodiment of the present invention, the aircraft for vertical take-off and landing can further include air vents positioned inside at least one of the wing openings. The air vents can provide further control of vertical thrust.

In an alternate embodiment of the present invention, the aircraft for vertical take-off and landing can further include louvres positioned over or under the air vents to assist in controlling the vertical thrust provided by the propellers.

In an alternate embodiment of the present invention, the aircraft for vertical take-off and landing can control the functionality of the propellers to provide flight control for the aircraft.

In an alternate embodiment of the present invention, the aircraft for vertical take-off and landing includes a modular fuselage, wherein the fuselage comprises a pod and wherein the pod is separable from the fuselage and is used to contain at least one of cargo and passengers.

In an alternate embodiment of the present principles, the aircraft for vertical take-off and landing includes a first wing portion comprising a foldable section and the foldable section is folded to reduce wingspan.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
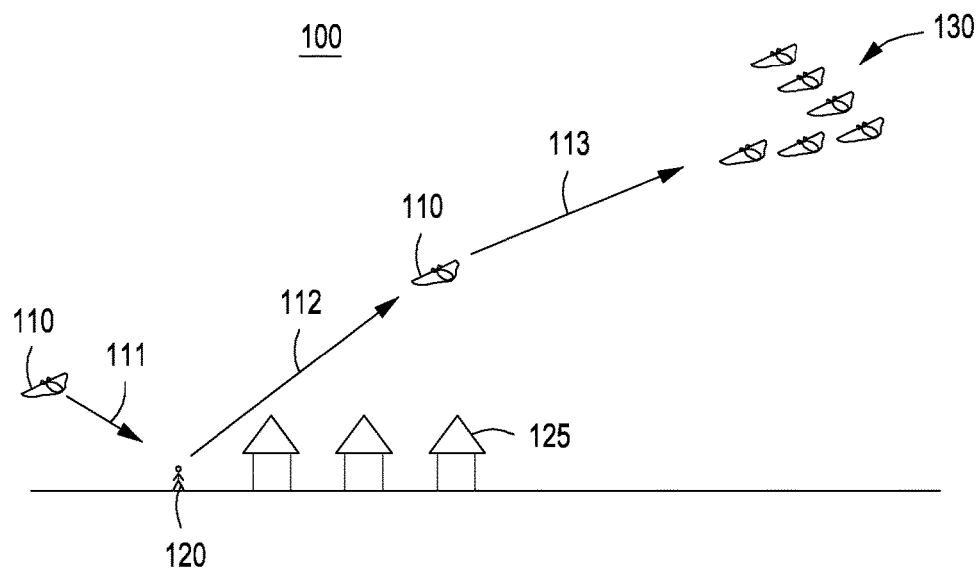
FIG. 1 shows an airborne system for distributed transportation of passengers and cargo in accordance with at least some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed.

Embodiments of the present invention provide an alternative distributed airborne transportation system, which can operate without airports. This distributed airborne transportation system is based on a modular distributed transport approach, which uses relatively small-scale airborne vehicles capable of loading and unloading passengers and cargo at the point of a service request (a la taxi service) and of long-range travel using flight formation and other methods. Such a distributed airborne transportation system can offer advantages such as convenience for customers and scalability (i.e., the ability to grow in size and capacity). At the same time, it may be more advantageous than ground-based distributed systems, since it does not require the creation and maintenance of roadways on the ground. Non-limiting examples include providing transport systems and methods based on fixed-wing unmanned airborne vehicles with vertical take-off and landing capabilities.

In accordance with embodiments of the present invention, an airborne system is provided for distributed transportation of passengers and cargo as shown in FIG. 1. In a system 100 an airborne vehicle (vehicle 110) may be provided for a customer 120 at an arbitrary location 125. Vehicle 110 has a range of capabilities including, but not limited to: 111—landing at a site near customer location, 112—boarding a customer and taking off, and 113—ascending and reaching cruising speed and altitude. At a cruising altitude, vehicle 110 may join a fleet 130 comprised of similar airborne vehicles to produce a flight formation. Fleet 130 may include vehicles traveling to different destinations, but along the same route in the same general direction.

Flight formation as used herein, means an arrangement of airborne vehicles flying in sufficiently close proximity to each other to impact the flight characteristics of the fleet as a whole. Fleets in flight formation may include two or more airborne vehicles. Flight formation enables more energy efficient flight, while giving the flexibility of entering or leaving the fleet at any time. For example, flight in a V formation can greatly enhance the overall aerodynamic efficiency of the fleet by reducing the drag and thereby increasing the flight range.

Airborne vehicles that may be used in system 100 include helicopters, fixed-wing planes, VTOL (vertical take-off and landing) aircraft, rotorcraft, lighter-than-air airships, hybrid aircraft and others. Some of the methods described in this invention may also be applicable to a wider variety of aircraft options, including regular fixed-wing airplanes. In the latter case, however, the loading and unloading of cargo and passenger may be restricted to special locations and take place at small airports and airfields.

Small-scale aircraft suitable for these methods may utilize different flight control options, such as manual piloting, remote piloting, and automatic piloting. In the case of manual piloting, an on-board pilot is in full control of an aircraft and its maneuvers. In remote piloting, an aircraft is piloted by a person that is not on board of an aircraft via a radio communication link. In automatic piloting, an on-board computer system provides full flight control capabilities, including flight planning, path monitoring, maneuvering, transitioning between different aircraft configurations and so on. Finally, in a hybrid flight control option two or more of these options may be available, for example, so that the same aircraft may be piloted manually, remotely, or automatically at different times. The automatic piloting option is particularly attractive for flight formations, where precise and quick maneuvering is essential.

Cargo sections in these aircraft may take different forms depending on whether passenger transport is involved. Passengers may also be labeled as "Human Cargo" (HC) for generalization purposes. HC transport may occur via specialized containers or HC pods. Such pods may be loaded and unloaded onto airborne vehicles in a similar way to regular cargo containers.

Figure 2:
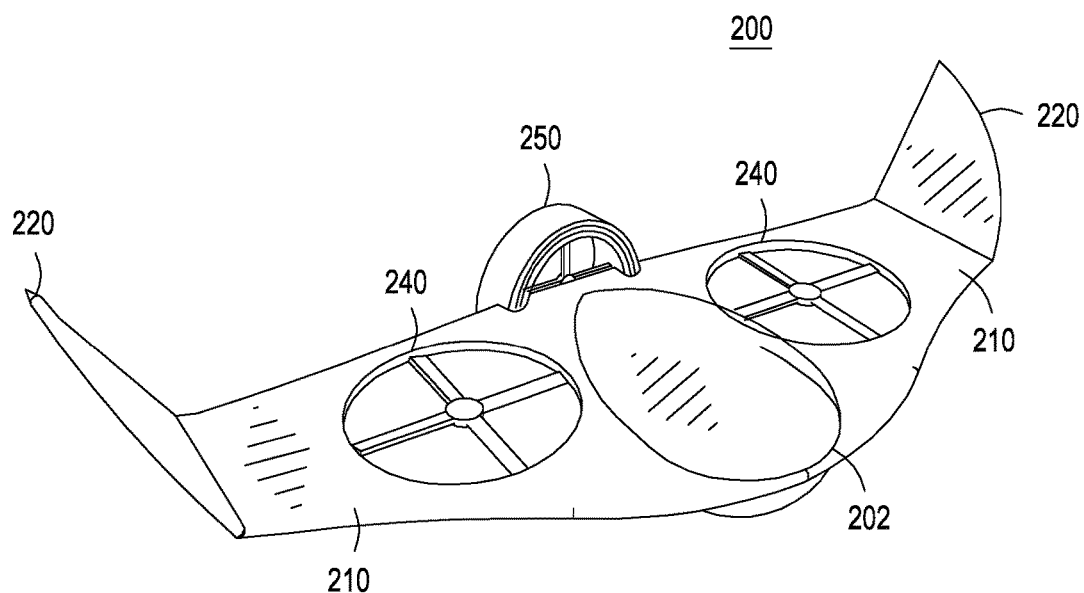
FIG. 2 shows an exemplary fixed-wing aircraft with vertical take-off and landing (VTOL) capabilities in accordance with at least some embodiments of the present invention.
Figure 3:
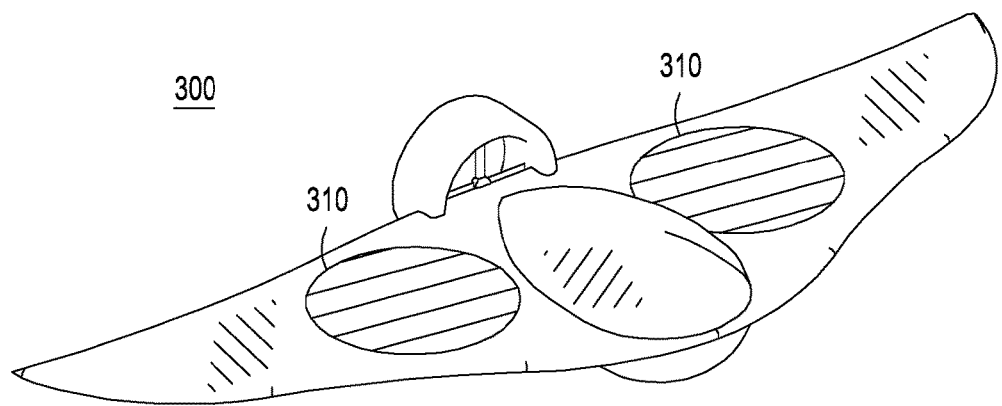
FIG. 3 shows an exemplary fixed-wing aircraft with vertical take-off and landing (VTOL) capabilities having shuttered fan openings in a VTOL vehicle configuration in accordance with at least some embodiments of the present invention.

In accordance with embodiments of the present invention, one of the preferred vehicles for this system is a fixed-wing aircraft with vertical take-off and landing (VTOL) capabilities. It combines the advantages of being able to take-off and land outside of airports and fly at relatively high cruising speeds (e.g., relative to helicopters). FIG. 2 shows, as an example of such an aircraft, a VTOL plane 200. This plane has tailless design using a fuselage 202 with sufficient room to accommodate one or more passengers. The wing sections, collectively 210, have built-in fans (or more generally vertical thrusters), collectively 240, for providing a vertical lifting force for take-off and landing. The wing section 210 may also fold its tips, collectively 220, for minimizing the size of the landing site. After a take-off, another motor with a propeller 250 (or more generally horizontal thrusters) may provide propulsion to achieve sufficient speed, at which the wing has enough lift and the fans can be turned off. At this point, the fan openings may be shuttered 310 as shown in FIG. 3 in a VTOL vehicle configuration 300.

Figure 4:
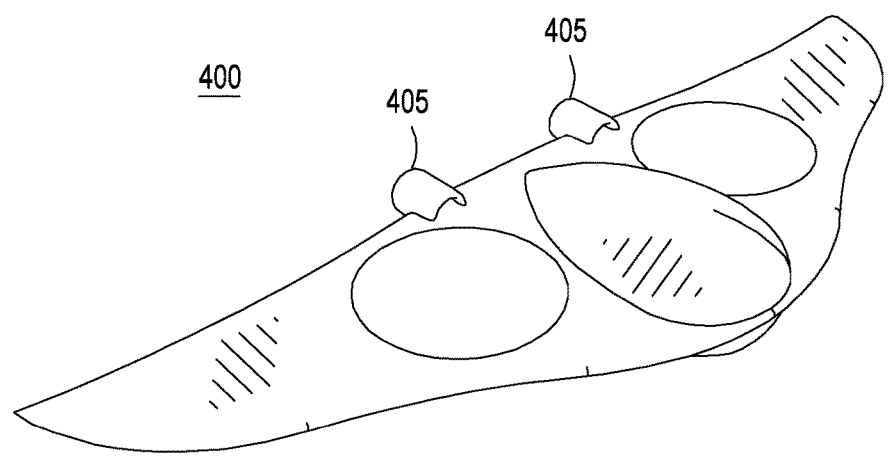
FIG. 4 shows a VTOL design in which the propulsion is provided by two ducted fans in accordance with at least some embodiments of the present invention.

Of course many other VTOL vehicles designs may be possible within the scope of this invention. For example, FIG. 4 shows a VTOL design 400 in which the propulsion is provided by two ducted fans, collectively 405. In alternate embodiments of the present invention, instead of fans, gimbaled motors with propellers can be used for both vertical and lateral propulsion. A preferred propulsion mechanism may include an electric motor with a propeller. However, one may use an electrically powered plasma jet engine as an alternative. As a result, cruising speeds, which may be achieved either by individual vehicles or within a fleet, may reach supersonic speeds.

Also, the wing shape may take different forms. In addition, a VTOL design with a tail may be used as an alternative. Folding-wing and/or folding-tail designs are particularly attractive, because it allows VTOL vehicles to land in tighter areas on the ground. A foldable wing is shown as an example in FIG. 2. Wings or some of their parts may be rotating to enable VTOL capabilities, in which for example a motor attached to the wing may be rotated by at least 90 degrees. Alternatively, other sections of the airframe may be rotating, e.g., the fuselage or some of its sections.

Various power systems and their combinations may be used for powering such vehicles, including fossil fuels, electric batteries, fuel cells, solar power, and other renewable power sources. A particularly attractive solution for this application comprises an electrically powered VTOL plane with additional solar photovoltaic (PV) power system, because of its efficiency and low noise. In addition, kinetic energy conversion systems may also be used as alternative energy sources, particularly in emergency situations. A preferred power system may have several redundant power sources, such as electrical batteries, fuel cells, and solar cells.

Figure 5:
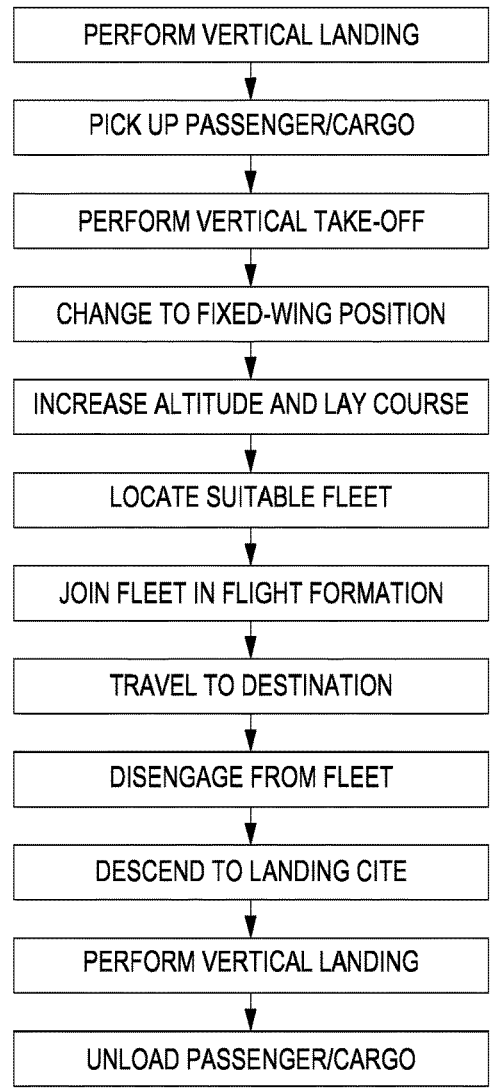
FIG. 5 shows an exemplary method for providing distributed airborne transportation services in accordance with at least some embodiments of the present invention.

In accordance with another embodiment of the present invention, FIG. 5 shows an exemplary method 500 for providing distributed airborne transportation services. The method 500 includes the following: (1) perform vertical landing, (2) pick up passengers and/or cargo, (3) perform vertical take-off, (4) transform to fixed-wing position, (5) increase altitude and lay out course, (6) locate suitable fleet, (7) join a fleet in flight formation, (8) travel to destination, (9) disengage from the fleet, (10) descend to landing site, (11) perform vertical landing, and (12) unload passengers or cargo. Some of these, such as (5) increasing altitude and laying the course for the airborne vehicle, may be optional in various embodiments. Alternatively, additional actions may be added, such as loading and unloading of additional passengers and/or cargo.

The above method and embodiments similar to this method, in general, may be subdivided into three method categories: (1) loading methods, (2) travel methods and (3) unloading methods. Loading and unloading methods may differ depending on whether the service is intended for passengers, cargo, or combinations thereof. For example, additional equipment and automated loading procedures may be implemented for loading and unloading cargo. Also, cargo may be loaded and unloaded even without the VTOL transport vehicle actually touching the ground, e.g., using air-to-air transfer between airborne vehicles or via the use of cables and parachutes.

Travel methods in particular may describe several phases of airborne transport or more generally the flight of a VTOL aircraft. At least two flight phases can be emphasized, including the vertical flight phase and the horizontal flight phase. During the vertical flight phase, the aircraft may stay airborne using primarily its vertical propulsion system. In this phase, the lift force is provided by the vertical thrust of the vertical propulsion system, while the aircraft may move in an arbitrary direction according to its flight plan, such as up, down, forward, backward, sideways or any other direction in space. For this purpose, the horizontal propulsion system may be used to provide not only the forward, but also the reverse thrust for lateral movements. In addition, the aircraft in the vertical flight phase may hover at a constant position and altitude and may be able to change its attitude, for example orientation in space (e.g., yaw, roll and pitch angles). This flight phase may implemented for example immediately after a take-off or before a landing. During the horizontal flight phase, the aircraft may stay airborne using primarily its horizontal propulsion system. In this flight phase, the lift force is provided by the aerodynamic lift of the aircraft wing, which arises from the forward motion of the aircraft activated by the horizontal propulsion system. The aircraft motion in the horizontal flight phase is somewhat limited in comparison to the vertical flight phase, so that the aircraft may move substantially in the horizontal plane, i.e. it may have to maintain a substantial horizontal component of its velocity vector in order to stay airborne. In addition, the aircraft in the horizontal flight phase may be able to perform typical fixed-wing aircraft flight maneuverers, such as ascent, descent, turns and others. In addition to these two main flight modes, other flight modes may exist, including transitional and hybrid modes, in which both vertical and horizontal propulsion systems may be engaged at the same time providing lift and maneuvering capabilities.

Figure 6:
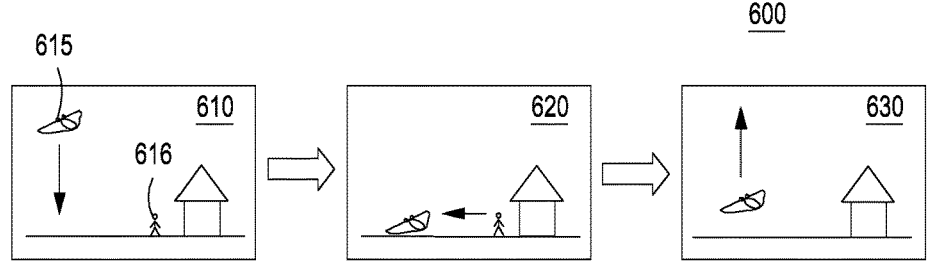
FIG. 6 shows schematically an example of a loading method in accordance with at least some embodiments of the present invention.

In accordance with some aspects of the present invention, FIG. 6 shows schematically an example of a loading method 600, which may be used, for example, in combination with the method 500 disclosed above. In some embodiments, the method 600 includes: performing a vertical landing of a vehicle 615 (shown by 610), loading a passenger 616 (shown by 620), and performing a vertical take-off by vehicle 615 with passenger 616 on board (shown by 630). Furthermore, the method 600 may further include a vertical ascent, in which the speed of the vehicle is substantially vertical and the lateral (horizontal) speed component may be smaller than the vertical speed component. Of course, the same method may be applied to loading of multiple passengers at the same location and/or loading of cargo. Alternatively, the process described by method 600 may be repeated at different sites and locations, so that different passengers and cargo or types of cargo may be loaded onto the same vehicle 615 (with or without complete or partial unloading of any existing passengers or cargo).

Figure 7:
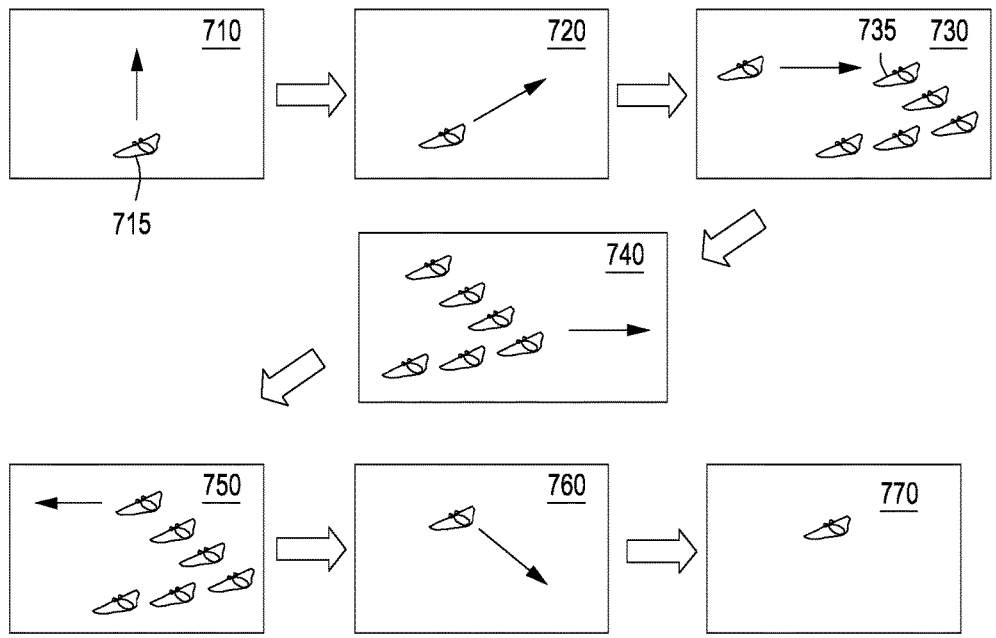
FIG. 7 shows schematically an example of a travel method in accordance with at least some embodiments of the present invention.

In accordance with another aspect of the present invention, FIG. 7 shows schematically an example of a travel method 700, which may be used, for example, in combination with the method 500 disclosed above. In some embodiments, the method 700 includes: increasing altitude of vehicle 715 using its VTOL capabilities (shown by 710), transforming vehicle 715 to a fixed-wing position and increasing its lateral (horizontal) velocity (shown by 720), locating a suitable fleet of airborne vehicles (fleet 735) and joining fleet 735 in flight formation (shown by 730), travelling towards a destination with fleet 735 (shown by 740), disengaging from fleet 735 (shown by 750), descending towards a landing site and transitioning to a vertical landing position (shown by 760), and reducing the altitude of vehicle 715 using its VTOL capabilities (shown by 770). Instead of joining an existing fleet, vehicle 715 may also join another airborne vehicle (similar or dissimilar) and thereby forming a two-vehicle fleet.

Figure 10:
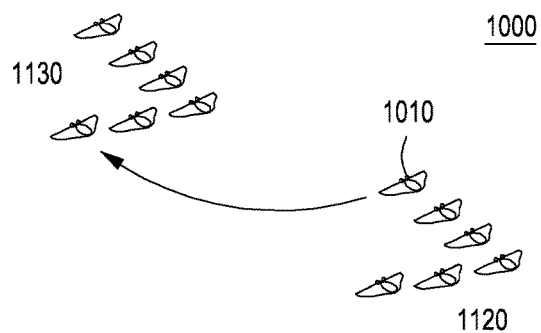
FIG. 10 shows schematically an example of a portion of a travel method in accordance with at least some embodiments of the present invention.

Of course, some of the above may be optional and omitted, or alternatively additional actions may be introduced. For example, vehicle 715 may communicate with fleet 735 before and/or after joining the fleet. Also, the vehicle 715 may travel for substantial distances without an accompanying fleet. Furthermore, some actions may be repeated. For example, vehicle 1010 may switch between different fleets 1020 and 1030, as shown by 1000 in FIG. 10, in which a part of its course may be travelled with one suitable fleet (e.g., 1020) and another part of the course may travelled with a different, preferably more suitable, fleet (e.g., 1030). The different fleet may be more suitable by providing one or more of a different flight path, a different destination, a more efficient flight formation, or the like. Alternatively or in combination, the method 700 may include changing the position of vehicle 715 within fleet 735. In some embodiments, the method 700 may include refueling and recharging of an airborne vehicle by another airborne vehicle (optionally within the same fleet), in which fuel and/or electrical energy respectively are exchanged between the two vehicles with assistance of a transfer line or a cable. Any travel method may also include optional actions related to emergency situations, in which a vehicle performs one or more actions necessary for communicating with a fleet and/or flight control authorities, quick disengagement from a fleet, rapid decent, or the like.

Figure 8:
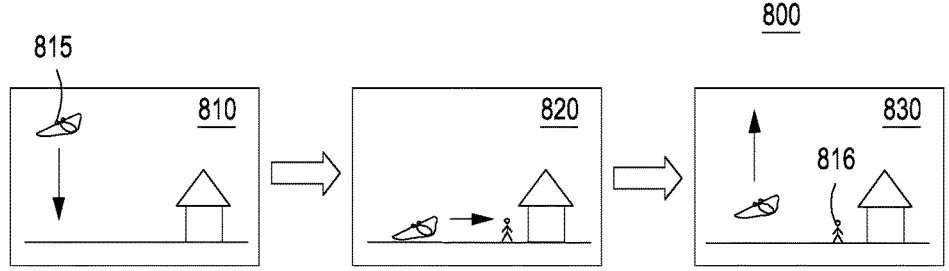
FIG. 8 shows schematically an example of a loading method in accordance with at least some embodiments of the present invention.

In accordance with yet another aspect of the present invention, FIG. 8 shows schematically an example of an unloading method 800, which may be used, for example, in combination with the method 500 disclosed above. In some embodiments, the method 800 includes: performing a vertical landing of a vehicle 815 (as shown by 810), unloading a passenger 816 (as shown by 820), and performing a vertical take-off by vehicle 815 (as shown by 830). Furthermore, the method 800 may include a vertical descent before landing, in which the speed of the vehicle is substantially vertical. Of course, the same method may be applied to unloading of multiple passengers at the same location and/or unloading of cargo. Alternatively, the process described by method 800 may be repeated at different sites and locations, so that different passengers and cargo or types of cargo may be unloaded onto the same vehicle 815. Furthermore, both loading and unloading methods include landing on suitable surfaces such as ground surfaces, roof surfaces (especially flat roofs), flight decks of large building and vehicles, floating decks on water surfaces, water surfaces (with appropriate landing gear), road surfaces, off-road surfaces, and so on.

In accordance with embodiments of this invention, loading, unloading, and travel methods described above may be modified, shortened, expanded, and combined with each other to produce different sequences of procedures for airborne transportation services. For example, loading methods may be combined with unloading methods, so that the same airborne vehicle may be used for loading and unloading passengers/cargo at the same location at the same time. In another example, the same airborne vehicle may be used for loading and/or unloading passengers/cargo at the same location at the same time while one or more passengers and/or cargo remains on the plane to continue to a subsequent destination.

Figure 9:
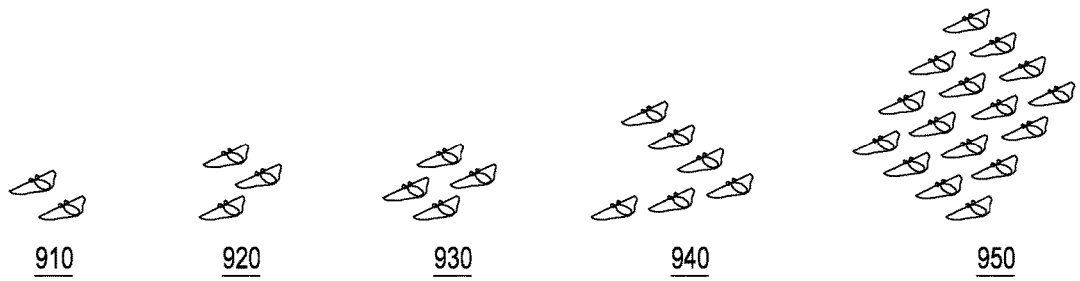
FIG. 9 shows examples of several fleet configurations in accordance with at least some embodiments of the present invention.

In accordance with another embodiment of this invention, different fleet configurations may be used in the travel methods described above. FIG. 9 shows examples of several fleet configurations 910-950, which differ from each other in size, shape, and number of members. At least one of the driving factors for a fleet formation is the optimization of energy consumption by each vehicle within the fleet. By flying next to each other, vehicles in a fleet as a whole reduce the power necessary for their propulsion in a level flight. Generally, the power reduction is larger in a larger fleet. Thus, the fleet is able to perform level flight on net propulsion power that is less than sum of propulsion powers of all its airborne vehicles flown separately. The inter-vehicle separation within the fleet should be less than 100 wing spans of typical member vehicle and generally may vary from tens to a fraction of the characteristic wing-span of its members. In order to minimize the size of the fleet and maximize its efficiency, the separation between neighboring airborne vehicles may be preferable to be less than 10 wing spans. It is also preferable that lateral separation (along the wing span) between airborne vehicles is substantially smaller than the longitudinal separation (along the flight path). The altitude of the airborne vehicles in flight formation may be substantially the same. The difference in altitude may be governed by the requirement to retain the aerodynamic drag reduction in flight formation and typically is a fraction of the wing span of the airborne vehicle.

As a result, fleets may form complex two-dimensional and three-dimensional patterns. Aircraft within a single fleet may change their positions with respect to each other, in order to optimize their power consumption, change fleet configuration and respond to environmental changes. Due to this complexity, autonomously piloted vehicles (APV) may be better at formation flying in comparison to manually piloted aircraft. Auto-piloting software on board of APVs may be further specialized for formation flying. Additional APV capabilities that simplify formation flying may include direct communication channels between different APVs within a fleet, local area networking capabilities for data exchange within a fleet (e.g. ad hoc networking), sensors and beacons for automatic collision avoidance, etc.

The fleets described above may have at least two ways to organize themselves into a stable formation. One way is via a centralized control from a single command source following procedures and patterns formulated in advance. The other way is via a distributed (ad hoc) control mechanism, in which each airborne vehicle determines its position within its fleet autonomously, and with the assistance from other vehicles from the same fleet only if necessary. The latter approach of a self-organizing airborne fleet is particularly attractive and should be a preferred way, since it is faster, safer, more economical, responsive, adaptive, and scalable.

Figure 11:
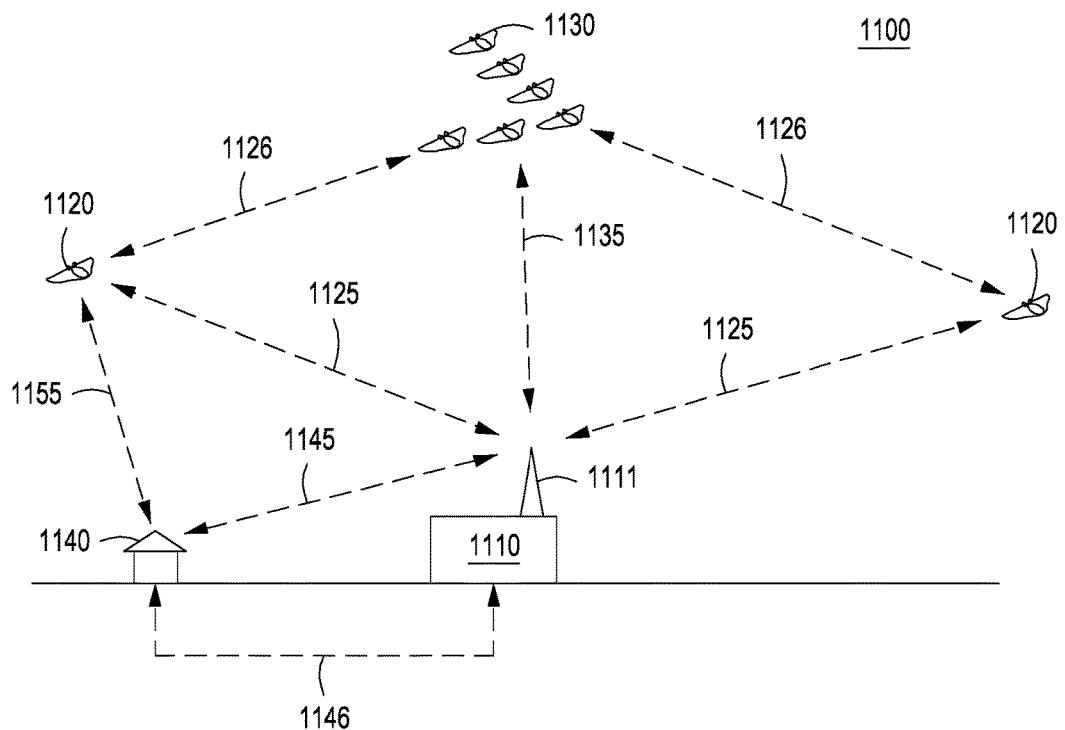
FIG. 11 shows a distributed transportation system in accordance with at least some embodiments of the present invention.

In accordance with another embodiment of the present invention, FIG. 11 shows a distributed transportation system 1100, which includes a control center 1110, individual airborne vehicles 1120, and fleet of airborne vehicles 1130. The control center and each vehicle are equipped with means for wireless communications (e.g., 1111 in FIG. 11), such as RF antennas, transmitters, and receivers. Alternatively, this means may include free space optical communications equipment. As a result, the system 1100 is configured to have bi-directional wireless links between its components (i.e., ground based stations and airborne assets) for exchange of flight control signals, telemetry data, navigational signaling, and so on. For example, FIG. 11 shows wireless links 1125 between the control center 1110 and the individual airborne vehicles 1120 and wireless links 1135 between the control center 1110 and the fleet of airborne vehicles 1130, as well as direct wireless links 1126 between individual airborne vehicles 1120. In addition, system 1100 is provided with communication links to customers and/or their premises 1140, including wireless links 1145 and wired links 1146, for the purposes of receiving customer orders, tracking their location, updating their status, exchanging relevant information and so on. Furthermore, a direct communication link 1155 between an airborne vehicle 1120 and customers/premises can be established for faster and more accurate exchange of information. Thus, as shown in FIG. 11, one or more communication links can be established with an airborne vehicle to provide one or more of customer information, navigational data, or flight data from other airborne vehicles to the airborne vehicle.

Furthermore, the system 1100 may be expanded to include other elements. For example, it may comprise multiple fleets of various sizes that are able to dynamically vary in size and complexity. It may include additional ground-based facilities, such as additional control centers, maintenance centers, heliports, communication towers and so on. It may include parking areas for vehicles on stand-by, waiting for passengers. It may also include sea-based facilities, such as aircraft carriers, sea-based control centers (for example, located on boats and sea vessels), and aircraft suitable for landing on water. Furthermore, it may include space-based facilities, such as satellites for establishing additional communication links between control centers, airborne vehicles and customers.

Figure 12:
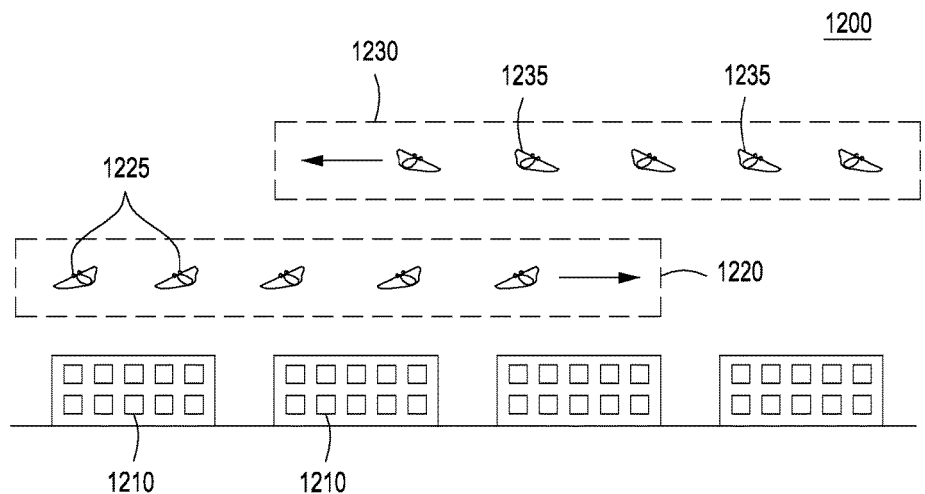
FIG. 12 shows a distributed transportation system in accordance with at least some embodiments of the present invention.

In accordance with another embodiment of this invention, FIG. 12 shows a distributed transportation system 1200, in which flight formation is used for organizing airborne transportation in the urban area. In this case an area on the ground may be densely populated with people and buildings 1210. Such an area may be heavily trafficked both on the ground and in the air. Formation flying may be a useful tool under such conditions for organizing flight patterns of and ensuring safety of multiple small-scale aircraft of the type described in the above, even for short range travels within the same metropolitan area. In this case, minimizing fleet power consumption is unimportant or less important, and different flight formations are therefore possible. For example, FIG. 12 shows two fleets 1220 and 1230, each comprised of multiple airborne vehicle 1225 and 1235 in a straight line. These fleets are able to fly in formation in different directions without collision and interference from each other by having different altitudes and/or different lateral positions.

Figure 13:
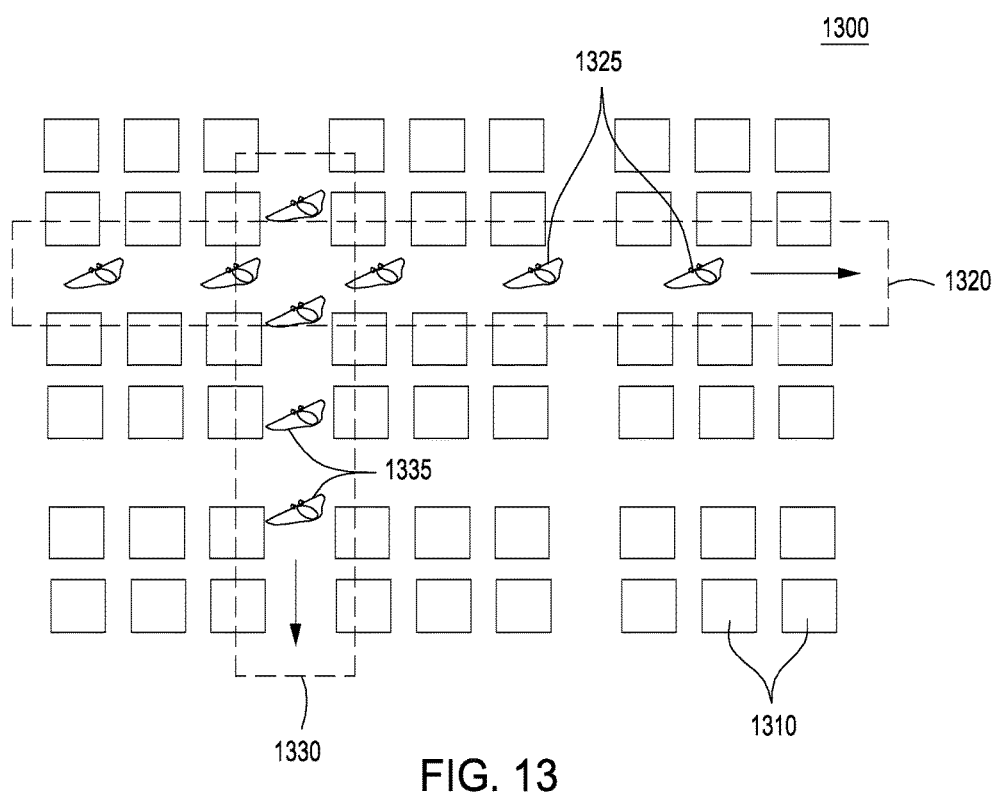
FIG. 13 shows a top view of a distributed transportation system in accordance with at least some embodiments of the present invention.

Similarly, FIG. 13 shows a top view of a distributed transportation system 1300 in an urban area populated with buildings 1310. The system 1300 includes two fleets 1320 and 1330, each comprised of multiple aircraft 1325 and 1335 in flight formation. The aircraft in the same formation maintain the same speed, heading, altitude and separation between neighboring aircraft. Flight routes for such fleets may be predefined in advance and programmed in with GPS (Global Positioning System) markers in the flight control software. Therefore, the two fleets at different altitudes may cross each other paths without interference as illustrated in FIG. 13. Typical separation between different aircraft in urban flight formation may range from 1 to 10 wing spans of a single airborne vehicle, but in general cases may exceed this range. Urban areas also provide additional options for take-off and landing, such as roofs of the buildings. VTOL vehicles may use flat roofs as convenient and safer alternative for loading and unloading of passengers and cargo. In this case, the roof may be appropriately modified to fit the requirements of such VTOL vehicles, for example, by providing launching/landing pad markings, roof reinforcements to support the weight of aircraft, clearance for landing and take-off above a launching/landing pad, support facilities to accommodate cargo, passengers and aircraft for maintenance and so on.

Although various methods and apparatus are described above in particular exemplary embodiments, variations and combinations of the methods and apparatus are contemplated. For example the disclosed methods may be performed in connection with any of the disclosed systems and airborne vehicles, as well as with other alternative systems and vehicles. In addition, various modifications of the methods, such as omitting optional processes or adding additional processes may be performed.

For example, in some embodiments, a method for distributed airborne transportation may include providing an airborne vehicle with a wing and a wing span, having capacity to carry one or more of passengers or cargo (e.g., any of the airborne vehicles disclosed above). The airborne vehicle may be landed near one or more of passengers or cargo and the at least one of passengers or cargo loaded into the airborne vehicle. Next, the airborne vehicle takes-off and a flight direction for the airborne vehicle is determined. At least one other airborne vehicle having substantially the same flight direction is located. The airborne vehicle then joins at least one other airborne vehicle in flight formation to form a fleet, in which airborne vehicles fly with the same speed and direction and in which adjacent airborne vehicles are separated by distance of less than 100 wing spans.

In another example, a method for distributed airborne transportation within an area on the ground may be provided by providing an airborne vehicle with a wing and a wing span, having capacity to carry at least one of passengers or cargo (e.g., any of the airborne vehicles disclosed above). Non-intersecting flight routes in the area are determined and defined. The airborne vehicle is landed and at least one of passengers or cargo is loaded into the airborne vehicle. The airborne vehicle then takes-off and an appropriate flight route for the airborne vehicle is selected. The airborne vehicle then merges into the flight route.

In another example, a distributed airborne transportation system includes a plurality of airborne vehicles, each having a wing and vertical take-off and landing capabilities (e.g., any of the airborne vehicles disclosed above). An airborne fleet is defined comprising at least two of the plurality of airborne vehicles flown in flight formation (e.g., as described in any of the embodiments disclosed herein). The lateral and vertical separation between the airborne vehicles within the fleet is less than the average wingspan of the plurality of airborne vehicles in the airborne fleet. A flight control center (e.g., 1110) is provided with established wireless communication links between the flight control center and the plurality of airborne vehicles.

Figure 14:
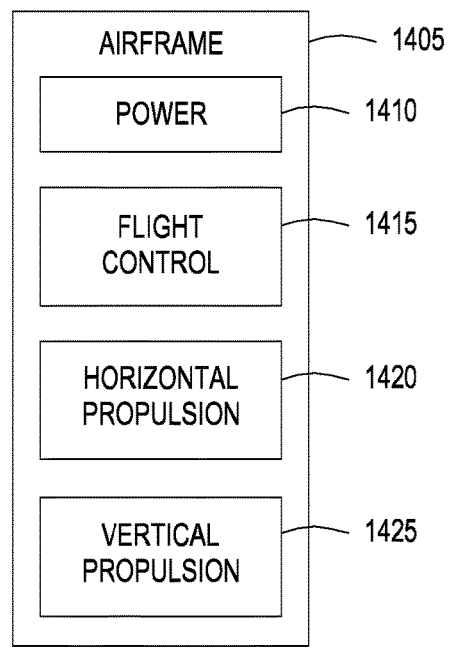
FIG. 14 shows a functional block diagram of an aircraft in accordance with an embodiment of the present invention.

In accordance with various embodiments of the present invention, one of the preferred vehicles for the above described methods and system is a fixed-wing aircraft with vertical take-off and landing (VTOL) capabilities. Such an aircraft of the present invention combines the advantages of being able to take-off and land outside of airports and fly at relatively high cruising speeds (e.g., relative to helicopters). FIG. 14 shows a functional block diagram of an aircraft, illustratively a VTOL plane 1400, in accordance with an embodiment of the present invention. The functional block diagram of the VTOL plane 1400 of FIG. 4 illustratively includes an airframe 1405 and systems for power (power system 1410), flight control 1415, horizontal 1420 and vertical propulsion 1425. As will be depicted and described with reference to figures described below, the airframe 1405 may include one or more wing portions, a fuselage, and an empennage (a tail section). In accordance with various embodiments of the present invention, parts of the airframe 1405 may be modular and/or may be able to change its form (e.g. a modular fuselage that can be separated into multiple sections, a foldable wing that can change its shape in flight, etc.). In various embodiments of the present invention, the power system 1410 may include fuel storage and fuel distribution subsystems, electrical storage (e.g. batteries), power generation units (e.g. solar photovoltaic power systems, fuel cells and electrical generators), electrical power distribution circuits and power electronics (not shown). The horizontal and vertical propulsion systems may include propulsion means, such as propellers, turbines and jets, powered by engines and/or electrical motors. The horizontal and vertical propulsion systems may be separate from each other, so that they can be designed and operated independently.

VTOL aircraft in accordance with various embodiments of the present invention, unlike more conventional VTOL aircraft, can have several distinguishing features. In one embodiment in accordance with the present invention, a VTOL aircraft has separate propulsion systems for vertical and horizontal transport, so that the vertical propulsion system serves primarily the purpose of providing the vertical (upward) thrust and the horizontal propulsion system serves primarily the purpose of providing the forward thrust. Such embodiments enable a more efficient design, the ability of separate optimization and better performance of each propulsion system. Such embodiments also enable integration of very different propulsion mechanisms, for example jet propulsion and propeller-driven propulsion for the horizontal and vertical propulsion systems, respectively, or vice versa.

In alternate embodiments, the vertical propulsion system may be housed in the main wing of a VTOL aircraft, rather than a separate part of the airframe. In such embodiments, the housing for vertical thrusters may be integrated into the wing structure. To achieve this, the wing of a VTOL aircraft may include openings for vertical thrusters. As a result, the wing may serve a dual purpose of housing the vertical propulsion system and providing the lift force during the horizontal flight phase. The lift force may be provided by the entire surface of the wing including the wing portion with the openings and housing for the vertical thrusters. The extension of the lifting surface to the area around the wing openings may be accomplished by providing a continuous airfoil shape throughout the wing, including the openings.

Figure 40:
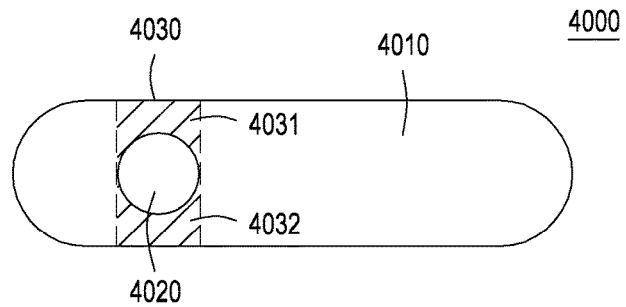
FIG. 40 shows a high level diagram of a wing assembly in accordance with an alternate embodiment of the present invention.

In order to further illustrate this point, FIG. 40 shows a wing assembly 4000, comprising a wing surface 4010 and at least one wing opening 4020 for housing a vertical thruster (not shown). Also a section of the wing 4030 around the wing opening 4020 is highlighted. The section 4030 may in turn comprise at least the bow section 4031 and the aft section 4032, which are the areas of the wing immediately before and after the wing opening 4020, respectively, along the flight direction of the wing. The whole section 4030 and the sections 4031 and 4032, in particular, may be shaped to have airfoil profiles to minimize the drag and provide the aerodynamic lift force.

In alternate embodiments, the wing openings for vertical propulsion system may include air vents, which may be closed to cover vertical thrusters and create a continuous wing surface on both sides of the wing in the horizontal flight phase. This may further increase the lift force of the wing in the horizontal flight phase by increasing the area of the wing lifting surface. The air vents may include flaps that allow the wing to form a continuous airfoil surface on both sides of the wing in the wing opening area. Such an embodiment enables integration of much larger vertical thrusters and/or larger number of vertical thrusters than would be possible without the air vents.

In various embodiments of the present invention, vertical thrusters may have slim profiles to fit inside the wing openings. The wing thickness in the area of the wing opening should be sufficiently large to encompass the entire vertical thruster assembly and enable any existing air vent to close. Various embodiments enabling the slim design are depicted and described with reference to the following Figures, including, in particular, shaft-less vertical thrusters described below.

In various embodiments of the present invention, the vertical and horizontal propulsion systems may function independently from each other and their operation may be enabled by either a single flight control system or a dual flight control system; the latter comprising two flight control subsystems, which control the vertical and horizontal propulsion systems, respectively. In such embodiments, the two propulsion systems may also operate concurrently, simultaneously providing the vertical and horizontal thrusts, for example during a transition period between the vertical flight and horizontal flight phases. In such embodiments, a hybrid flight control mode may be executed by the flight control system that enables and synchronizes the simultaneous operation of the vertical and horizontal propulsion systems. Due to the complexity of such an operation, in such embodiments, flight control modes may be at least in part automated.

In accordance with various embodiments, a VTOL aircraft of the present invention may enable hybrid flight modes unavailable in a conventional aircraft, in which the vertical and horizontal propulsion systems are operated simultaneously. For example, in one embodiment the propeller-based vertical thrusters may provide lift in the horizontal flight phase using auto-gyro effect, as described in more detail below. In alternate embodiments, the vertical thrusters may be used in the horizontal flight phase for attitude changes of an aircraft in place of conventional flight control surfaces, such as ailerons, elevators and rudders, which is described in further detail below.

Figure 15:
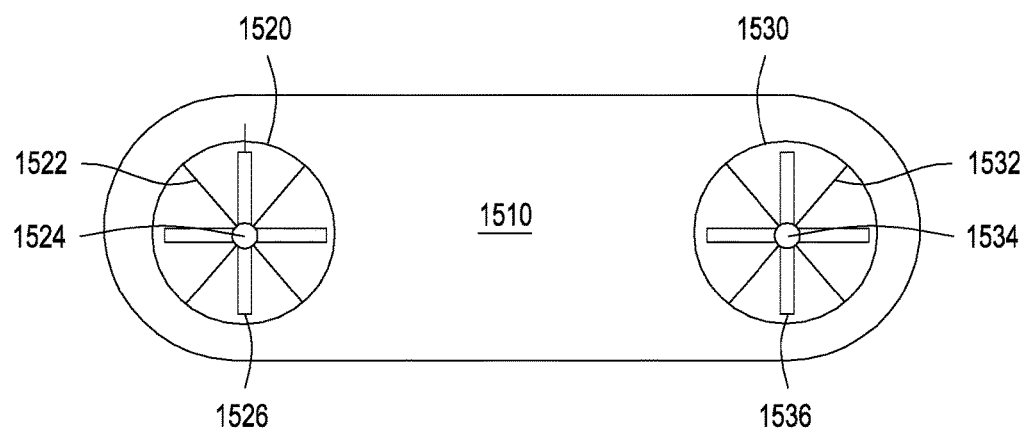
FIG. 15 shows a high level diagram of a wing assembly in accordance with an embodiment of the present invention.

FIG. 15 shows a high level diagram of a wing assembly 1500 in accordance with an embodiment of the present invention. The wing assembly 1500 of FIG. 15 illustratively includes a wing body 1510, and wing openings 1520, 1530 that are used for housing vertical propulsion fans or thrusters consisting of mounting frames 1522 and 1532, motor shafts 1524 and 1534, and propellers 1526 and 1536. In accordance with various embodiments of the present invention, a wing assembly may include one or more opening for mounting a vertical propulsion assembly. The wing openings provide an airflow passage through a wing, which is necessary for achieving a vertical thrust for either take-off or landing. In accordance with various embodiments, the propellers 1526 and 1536 may have either fixed or variable pitch, allowing for a greater flexibility in the design and operational capabilities of an aircraft, such as a VTOL aircraft of the present invention. In various alternate embodiments of the present principles, engines and other torque-producing machines may be used in place of motors used to drive the propellers. Also, in alternate embodiments of the present invention, direct thrust-producing machines, like jet engines, may be used in place of propeller-based propulsion.

Figure 16:
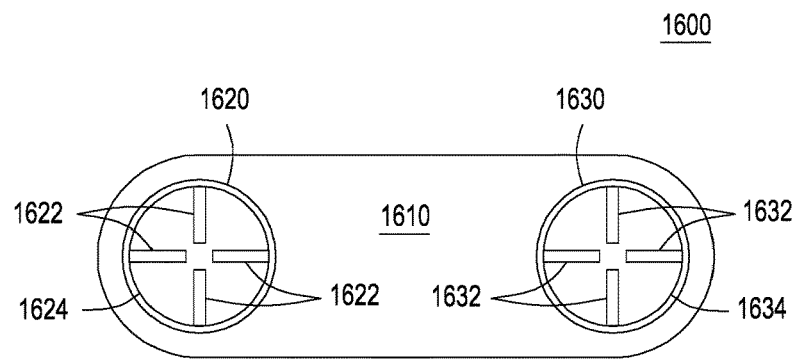
FIG. 16 shows a high level diagram of a wing assembly in accordance with an alternate embodiment of the present invention.

FIG. 16 shows a high level diagram of a wing assembly 1600 in accordance with an alternate embodiment of the present invention. The wing assembly 1600 of FIG. 16 illustratively includes a wing body 1610, and wing openings 1620 and 1630 that are used for housing vertical thrusters consisting of shaftless propellers 1622 and 1632, and rims 1624 and 1634. In the embodiment of FIG. 16, the propellers 1622 and 1632 are attached to the respective rims, which are in turn connected to the frames of the wing openings 1620 and 1630 in such a way as to allow the rims to rotate freely around their respective axes. In one embodiment of the present invention, this is achieved by using either contact suspension, e.g. with ball bearings, or contactless suspension, discussed in more detail below. In alternate embodiments of the present invention, the rims may also contain ring motors or parts of ring motors that provide the torque required for their rotation.

Figure 17:
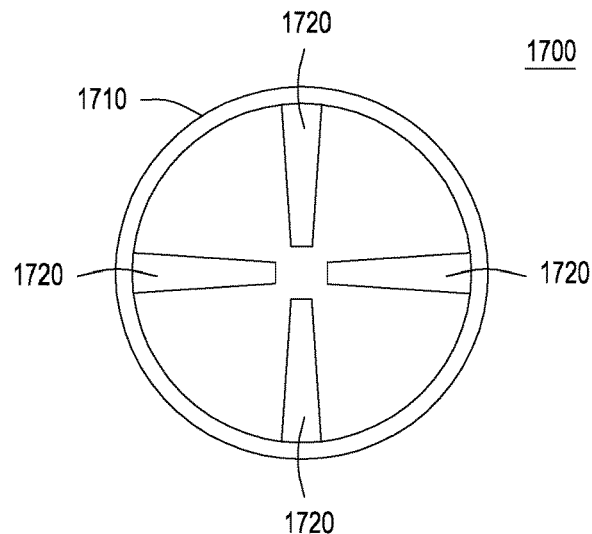
FIG. 17 shows a free-standing shaft-less propeller assembly in accordance with an embodiment of the present invention.

For purposes of clarification, FIG. 17 shows a blown-up view of a free-standing, shaft-less propeller assembly 1700 in accordance with an embodiment of the present invention. The propeller assembly 1700 of FIG. 17 illustratively includes a rim 1710 and four propeller blades 1720. It should be noted that, in accordance with the present principles, the number of propellers may vary, however, it may be preferred to have at least two blades for a balanced rotation. The propeller blades may have either fixed or variable pitch. In various embodiments of the present principles, the whole or a part of the assembly 1700 may be constructed from lightweight composite materials, either as a single piece or from multiple pieces. The advantages of such a shaft-less, rim-driven propeller in comparison to a typical shaft-driven propeller include at least greater propeller efficiency, more compact design, lower profile, lower weight due to lack of a shaft and its mounting frame.

Figure 18:
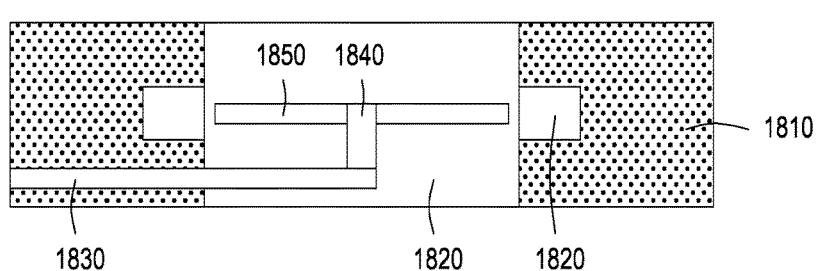
FIG. 18 shows a cross-sectional diagram of an exemplary mounting approach for shaft-driven propellers, such as the propellers of FIG. 15 in accordance with an embodiment of the present invention.

FIG. 18 shows an exemplary mounting approach 1800 for shaft-driven propellers, such as the propellers 1526, 1536 of FIG. 15 in accordance with an embodiment of the present invention. In the embodiment of FIG. 18, the wing body 1810 includes an opening 1820 for housing a mounting frame 1830. The opening 1820 may be used for attaching a shaft 1840 with mounted propeller 1850. The shaft 1840 may comprise an electric motor (not shown) or other engine (not shown) for rotating the propellers with respect to the frame 1830. As depicted in the illustrative embodiment of FIG. 18, the opening 1820 may have an additional clearance for the blades of the mounted propeller 1850.

Figure 19:
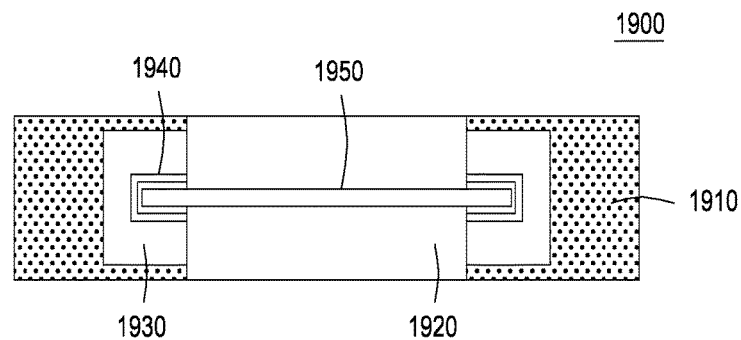
FIG. 19 shows a cross-sectional diagram of an exemplary mounting approach for rim-driven propellers, such as the propellers of FIG. 16 in accordance with an embodiment of the present invention.

FIG. 19 shows an exemplary mounting approach 1900 for rim-driven propellers, such as for example the propellers 1622 and 1632 of FIG. 16 in accordance with an embodiment of the present invention. In the embodiment of FIG. 19, the wing body 1910 includes an opening 1920 and a suspension mechanism 1930. The suspension mechanism 1930 may be used for holding a rim 1950 with rim-mounted propeller blades (not shown). The suspension mechanism may be in mechanical contact with the rim 1950 using a ball bearing assembly 1940 or other friction-reducing apparatus. Alternatively, a contactless suspension may be used, for example such as magnetic suspension systems or a suspension system based on pressurized air streams. In an embodiment including magnetic suspension, electrically activated and permanent magnets may be used to levitate the rim 1950 between the edges of the suspension mechanism 1930. In an embodiment including air stream suspension, high pressure air streams can be blown into the gap between the rim 1950 and the suspension mechanism 1930, allowing the rim 1950 to hover and maintain separation with the suspension mechanism 1930. In various embodiments, the rim 1950 and suspension mechanism 1930 may be integrated together with an electric motor (not shown) for rotating the rim 1950 with respect to the frame wing body 1910. For example, in such an embodiment, the rim 1950 may contain the rotor of a ring motor, while the suspension mechanism 1930 may contain the stator of the ring motor.

Figure 20:
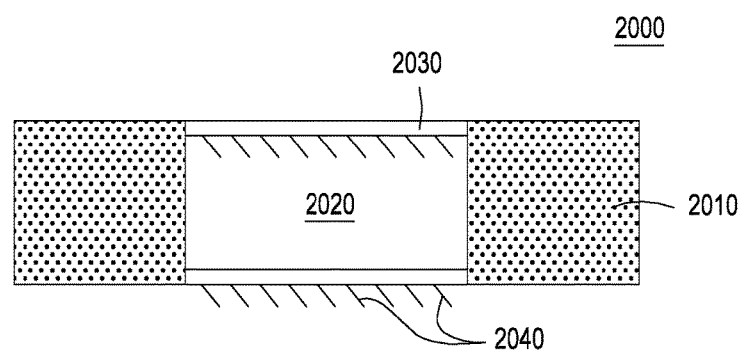
FIG. 20 shows a high level, cross-sectional diagram of a portion of a wing assembly in accordance with an alternate embodiment of the present invention.

FIG. 20 shows a high level cross-sectional diagram of a portion of a wing assembly in accordance with an alternate embodiment of the present invention. Illustratively, in the embodiment of FIG. 20, air vents 2030 are included to provide, for example, vertical thrust generation. That is, the wing assembly 2000 shown in FIG. 20 may include a wing body 2010, a wing opening 2020, and air vents 2030. The air vents 2030 may be opened and closed using louvres or flaps 2040. The wing opening 2020 may be used to house a thruster, which is not shown in FIG. 20. The air vents 2030 in the open position allow the air flow to pass from the top to the bottom of the wing through the wing opening, and in the closed position extend the closed area of the wing and increase the lift force and cover and protect the vertical thruster housed inside the wing opening.

Figure 21:
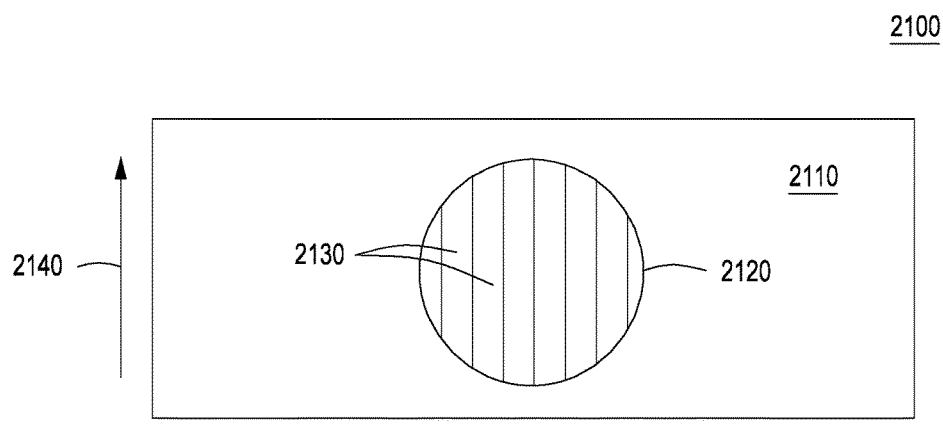
FIG. 21 shows a high level, top view diagram of a portion of a wing assembly, such as the wing assembly of FIG. 20, in accordance with an embodiment of the present invention.

FIG. 21 shows a high level, top view diagram of a portion of a wing assembly 2100, such as the wing assembly of FIG. 20, in accordance with an embodiment of the present invention. The wing assembly 2100 of FIG. 21, illustratively includes a wing body 2110, an opening 2120 and air vent flaps 2130. The air vent flaps 2130 may be aligned along the direction of flight 2140.

Figure 22:
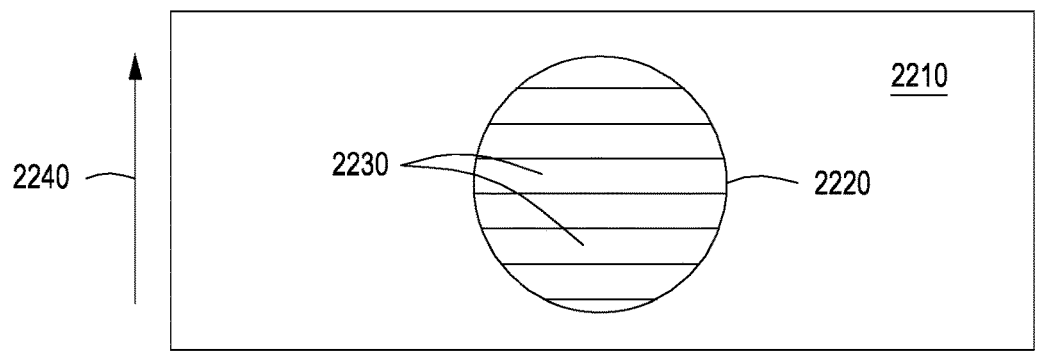
FIG. 22 shows a high level, top view diagram of a portion of a wing assembly in accordance with an alternate embodiment of the present invention.

FIG. 22 shows a high level, top view diagram of a portion of a wing assembly 2200 in accordance with an alternate embodiment of the present invention. The wing assembly 2200 of FIG. 22 illustratively includes a wing body 2210 with an opening 2220 and air vent flaps 2230 perpendicular to the flight direction 2240. In some applications, the wing assembly 2200 of FIG. 22 may be more beneficial than the wing assembly 2100 of FIG. 21, because it allows the flap surfaces in their closed position to better follow the airfoil contour of the wing assembly 2200.

Figure 23:
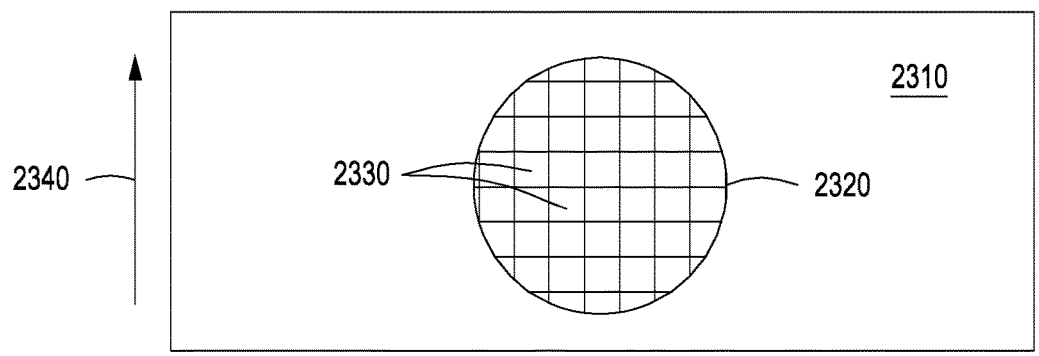
FIG. 23 shows a high level, top view diagram of a portion of a wing assembly in accordance with yet an alternate embodiment of the present invention.

FIG. 23 shows a high level, top view diagram of a portion of a wing assembly 2300 in accordance with yet another alternate embodiment of the present invention. The wing assembly 2300 of FIG. 23 illustratively includes a wing body 2310, a wing opening 2320 and air vent flaps 2330, illustratively arranged in a rectangular grid pattern. The air vent flaps 2330 of FIG. 23 provide more flexibility in the aircraft design and operation and improves its performance by providing higher lift in forward flight.

Figure 24:
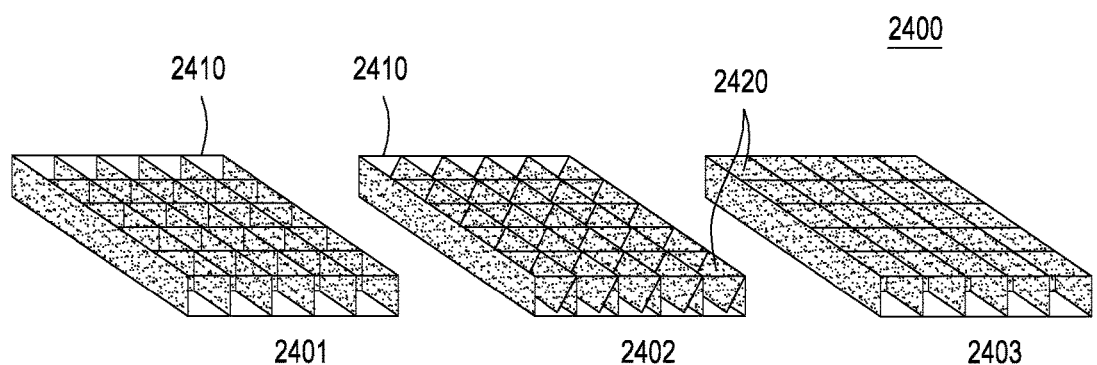
FIG. 24 shows a high level diagram of an air vent assembly including air vent flaps in accordance with an embodiment of the present invention.

FIG. 24 shows a high level diagram of an air vent assembly including air vent flaps in accordance with an embodiment of the present invention. The air vent flaps of the present invention may be opened and closed either individually or together. The air vent 2400 of FIG. 24 illustratively includes a vent grid 2410 and vent flaps 2420. In the air vent assembly 2400 of FIG. 24, three different vent configurations 2401, 2402, and 2403 are shown corresponding to open, partially open and closed vent positions, respectively. In the embodiment of FIG. 24, a rectangular vent grid 2410 is chosen, however, many other shapes, forms and sizes are possible within the scope of this invention (e.g. square, round, oval, polygonal etc.). The vent flaps 2420 may also include hinges (not shown) and actuators (not shown) that enable the opening and closing of the flaps. In various embodiments, the actuators may be powered mechanically, electrically or pneumatically to provide an active force for the actuation. Alternatively, the actuators may be passive, for example the flaps may be spring-loaded, so that under normal conditions when the vertical thrusters are not activated, they are in a closed position, but they may open under the influence of the vertical airflow when the thrusters are producing vertical thrust. In addition to flaps, other air vent shuttering mechanisms may be used, including sliding screens, diaphragm shutters, folding doors, rolling shutters and so on in accordance with various embodiments of the present invention.

Figure 25:
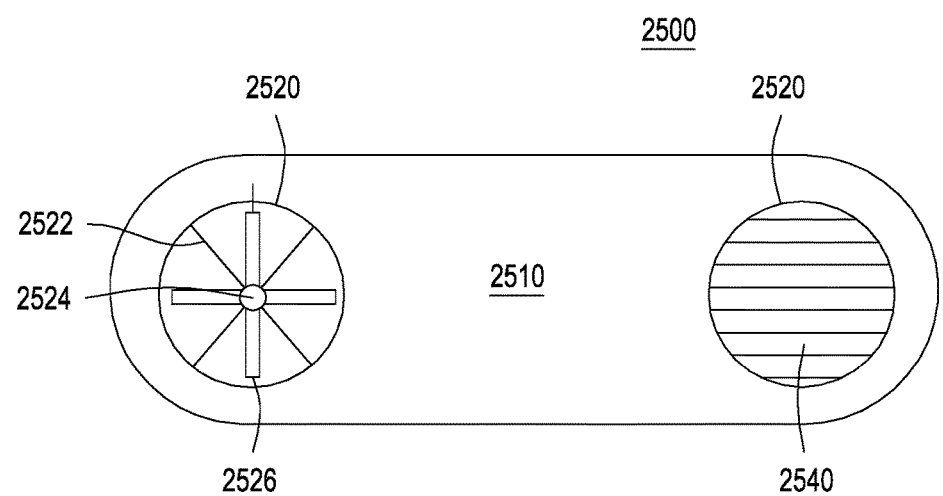
FIG. 25 shows a high level diagram of a wing assembly in accordance with an embodiment of the present invention.

FIG. 25 shows a high level diagram of a wing assembly 2500 in accordance with an embodiment of the present invention. The wing assembly 2500 of FIG. 25 illustratively includes a wing body 2510 and wing openings 2520. The wing openings 2520 may be used to contain thrusters used for vertical propulsion comprising a frame 2522, a shaft 2524 and propeller blades 2526. Alternatively and as described above, a shaft-less vertical propulsion system may be used. As depicted in the wing assembly 2500 of FIG. 25, in various embodiments of the present invention, at least one of the wing openings 2520 may include air vents 2540. The air vents 2540 may be opened to provide vertical airflow between the top and bottom of the wing assembly 2500, when the thruster is turned on to produce vertical thrust. The air vents 2540 may be closed when the aircraft is in a horizontal flight phase, when the horizontal thruster is engaged and the lift is generated primarily by the wing, rather than the vertical propulsion system. The closed air vents 2540 may closely reproduce the shape of the wing airfoil, so that the wing section with the openings may be able to generate substantially the same lift as the whole wing sections and the overall aerodynamic lift is maximized and the total drag is minimized.

Alternatively, the thrusters used for vertical propulsion during vertical ascent or descent may be used to produce lift during forward flight as well. Instead of using air vents to improve the wing aerodynamics, the lift may be produced by either powered or unpowered rotating propellers during forward flight via an autogyro lift effect, in which the vertical thruster propellers may auto-rotate under the influence of incoming air flow and generate vertical lift in a similar way to that of a fixed wing.

In accordance with alternate embodiments of the present invention, a method for transitioning from vertical to horizontal flight of a VTOL aircraft is provided, in which the horizontal propulsion system provides forward thrust and the vertical propulsion propellers are enabled to auto-rotate and provide at least a portion of the lift necessary to maintain a level flight. The auto-rotation may occur when the propellers are allowed to spin freely. At least for this purpose the vertical propulsion system may include a gearbox, which may enable for the vertical thruster propellers to disengage from the motor (or other torque-producing machine), switch to a neutral gear and enable free rotation of the vertical thruster propellers. In addition, the gearbox may be used to change the gear ratio between the motor and the propellers allowing them to rotate at different rates, so that the vertical propulsion system may be used in different flight modes and different flight mission requiring different thrust capabilities. For example, an empty aircraft and fully loaded aircraft may have different weights and thus require different vertical thrusts, which can be changed and optimized by varying the gear ratio.

Figure 26:
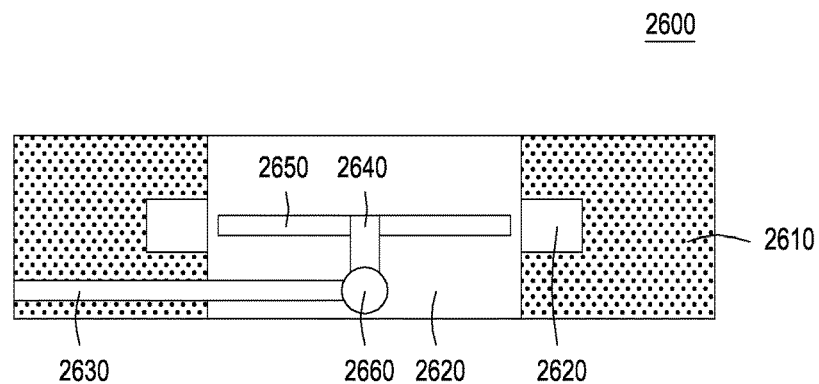
FIG. 26 shows a cross-sectional diagram of an exemplary mounting approach for vertical thrusters in accordance with an alternate embodiment of the present invention.

FIG. 26 shows a cross-sectional diagram of an exemplary mounting approach 2600 for vertical thrusters in accordance with an alternate embodiment of the present invention. That is, FIG. 26 shows a mounting approach 2600 for vertical thrusters with additional mechanical capabilities in accordance with an embodiment of the present invention. In the embodiment of FIG. 26, the wing body 2610 may have an opening 2620 for housing a mounting frame 2630. The mounting frame 2630 may be used for attaching a gimbal mount 2660, which in turn may hold a motor shaft 2640 with shaft-mounted propellers 2650. The gimbal mount may have one or two axes of rotation and may be used to tilt the vertical thruster assembly with respect to the mounting frame 2630 and the rest of the airframe, which may be useful under different flight conditions. More specifically, during the vertical flight phase, when the lift is produced primarily by the vertical propulsion system, the tilting gimbal mount 2660 may be used to stabilize an aircraft and provide a horizontal thrust component in the direction determined by the tilt direction. During the horizontal flight phase, when the lift is produced primarily by the wings, the tilting gimbal mount 2660 may be used to control the autogyro lift produced by the auto-rotating propellers. This enables the independent control of the angles between the wing and the vertical thruster propellers. Alternatively, in alternate embodiments of the present invention, instead of shaft-mounted propellers, rim-mounted propellers (e.g. FIG. 19), may be used to achieve a similar functionality. In such an embodiment, the rim assembly may be rotated as a whole around one or two axes to tilt vertical thrust in one or more directions.

In accordance with the present invention, the vertical propulsion system may comprise one or multiple thrusters, where each vertical thruster may be housed in a separate opening of an aircraft wing. The number of thrusters may be selected depending on characteristics of the aircraft and the thrusters. Also, different thrusters (e.g. having different sizes or thrust capabilities) may be used in the same vertical propulsion system. For example, a delta-wing aircraft having a wing with a triangular shape, may have a vertical propulsion system with three thrusters. If similar propeller-based thrusters are used in this case, then each thruster may comprise two coaxial propellers that are counter-rotating with respect to each other to improve stability of the aircraft. The coaxial counter-rotating propellers may be also used in other configurations with different number of thrusters, in order to increase the total thrust while minimizing the footprint of the resulting vertical propulsion system. A system with a small number of thrusters may require relatively large and powerful thrusters, while a system with a larger number of thrusters may be able to function with much smaller, but more efficient thrusters as illustrated below.

Figure 27:
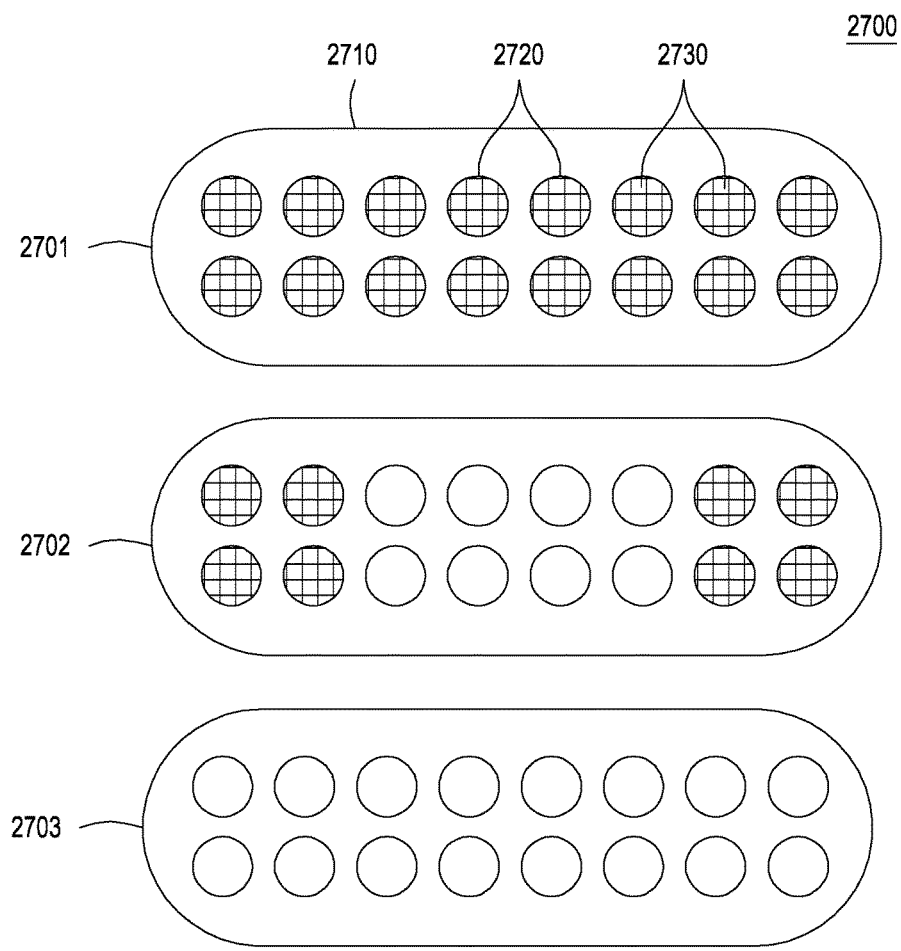
FIG. 27 shows a high level diagram of a wing assembly in accordance with an alternate embodiment of the present invention.

FIG. 27 shows a high level diagram of a wing assembly 2700 in accordance with an alternate embodiment of the present invention. The wing assembly 2700 of FIG. 27 illustratively includes a wing body 2710, multiple wing openings 2720 and optional air vents 2730. In the wing assembly 2700 of FIG. 27, the wing openings 2720 may be used to house vertical thrusters. The air vents 2730 may be opened and closed independently from each other as shown in FIG. 27. That is, wing assembly 2701 depicts wing air vents which are all fully closed, wing assembly 2702 depicts some wing air vents which are open and some wing air vents which are closed and wing assembly 2703 depicts wing air vents which are all fully open. Such a configuration in accordance with embodiments of the present invention, enables the gradual adjustment of the vertical thrust produced by the thrusters and improves the transition between the vertical and the horizontal flight phases described above. In addition, in various embodiments of the present invention, vertical propellers may be allowed to auto-rotate in the horizontal flight phase and produce lift in the vent open positions.

Figure 28:
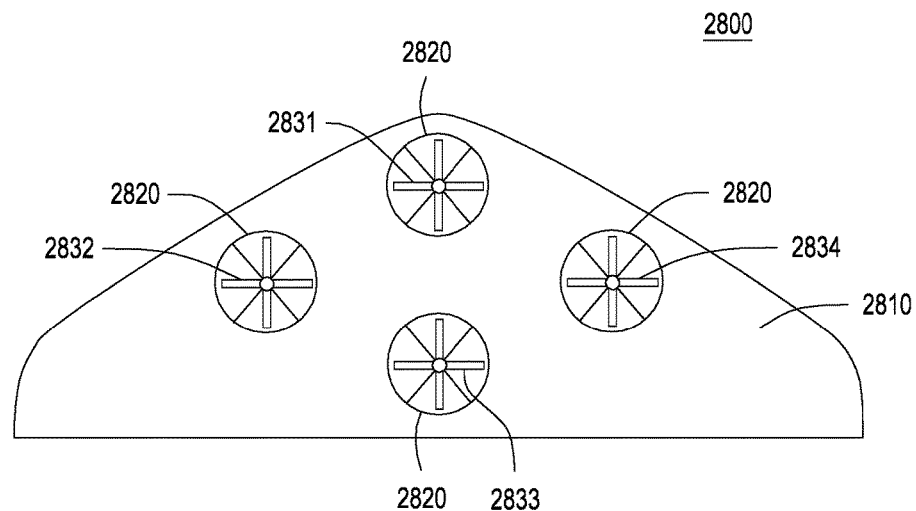
FIG. 28 shows a high level diagram of an aircraft assembly in accordance with an embodiment of the present invention.

FIG. 28 shows a high level diagram of an aircraft assembly 2800 in accordance with an embodiment of the present invention. In the embodiment of FIG. 28, the aircraft assembly 2800 comprises a VTOL aircraft having a wing shape and as such, in various embodiments of the present invention, such as the embodiment of FIG. 28, the entire aircraft assembly 2800 can be considered a wing or wing portion.

The inventors determined that a small aspect ratio wing, where the ratio of a wing span to the average chord is less than 10, may allow better placement of vertical propulsion fans on a wing. At the same time, close formation flight may counteract some of the inefficiencies due to the small aspect ratio of a wing. The aircraft assembly 2800 of FIG. 28 comprises a tailless aircraft including a wing portion 2810, wing openings, collectively 2820, and vertical thrusters, illustratively propellers 2831, 2832, 2833 and 2834. The aircraft assembly 2800 of FIG. 28 may further include a horizontal propulsion system (not shown). FIG. 28 shows four wing openings, but similar results may be achieved with any number of wing openings greater or equal than 3.

In accordance with the present invention, the aircraft assembly 2800 may be able to use the vertical thrusters for controlling its roll, yaw and pitch, which thus would enable not only the vertical take-off and landing, but also the maneuvering capabilities in the horizontal flight phase, such as turning, rolling, ascending and descending. For example, a positive vertical thrust provided by either of the propellers 2832 or 2834 may roll the aircraft assembly 2800 left or right, respectively and a vertical thrust provided by either the propellers 2831 or 2833 may pitch the aircraft assembly 2800 up or down, respectively. Maintaining the same thrust level by both thrusters in each pair of thrusters (2831 and 2833, or 2832 and 2834), so that they rotate in the same direction, may yaw the aircraft assembly 2800 to the left or to the right, thus turning the aircraft in a new direction. To compensate for unwanted roll, pitch and yaw all four thrusters may be turned on in order to provide a necessary maneuver. In various embodiments of the present principles, the aircraft assembly 2800 may include an automatic flight controller (an auto-pilot), which coordinates the torques and thrusts of all vertical thrusters in order to produce a desired maneuver involving changes in pitch, roll and yaw angles. The thrust produced by each thruster in this case may be substantially smaller than the thrust achieved during the vertical flight phase. In various embodiments of the present invention, the thrusters of the present invention can be controlled individually to provide flight control for the aircraft assembly of the present invention. That is, in accordance with various embodiments of the present invention, the thrusters can be individually turned on and off and the thrust of each thruster can also be controlled individually.

Figure 29:
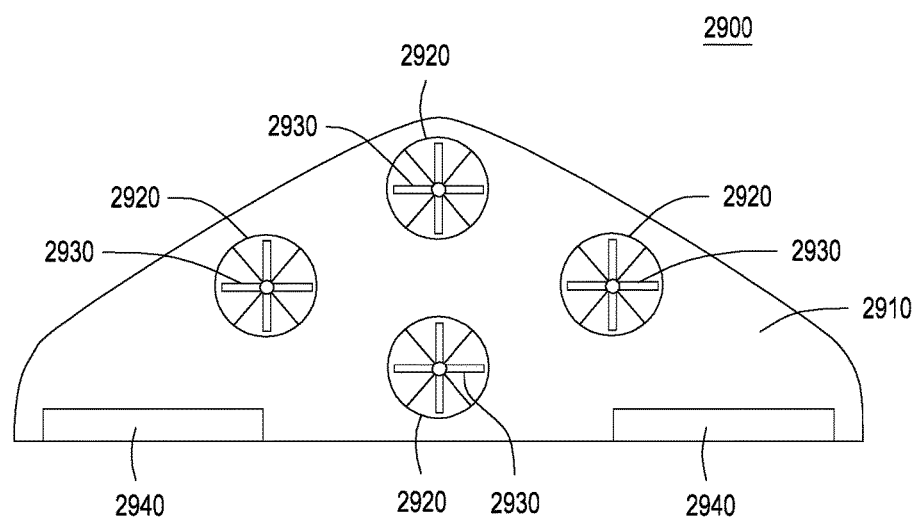
FIG. 29 shows a high level diagram of an aircraft assembly in accordance with an alternate embodiment of the present invention.

FIG. 29 shows a high level diagram of an aircraft assembly 2900 in accordance with an alternate embodiment of the present invention. The aircraft assembly 2900 of FIG. 29 comprises a tailless aircraft including a wing portion 2910, wing openings, collectively 2920, vertical thrusters, collectively 2930, and ailerons, collectively 2940. The aircraft assembly 2900 of FIG. 29 may further include a horizontal propulsion system (not shown). A difference between the aircraft assemblies 2800 and 2900 is that the latter has additional flight control surfaces that enable aircraft maneuvering in the horizontal flight phase. Unlike a regular plane, the aircraft assembly 2900 of the present invention has an option to use the vertical thrusters for horizontal maneuvering as described above with respect to the aircraft assembly 2800, which also increases its flight control redundancy and maneuvering capabilities in accordance with the present invention.

Figure 30:
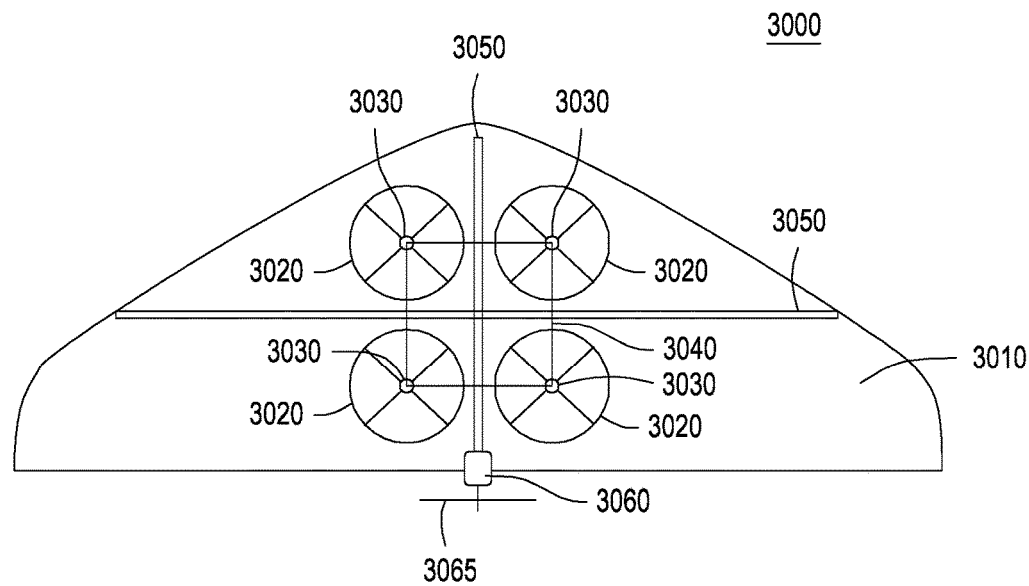
FIG. 30 shows a high level diagram of an aircraft assembly in accordance with yet an alternate embodiment of the present invention.

FIG. 30 shows a high level diagram of an aircraft assembly 3000 in accordance with an alternate embodiment of the present invention. The aircraft assembly 3000 of FIG. 30 includes a wing portion 3010, wing openings, collectively 3020, vertical thrusters, collectively 3030, a vertical propulsion frame 3040, wing spars 3050 and a horizontal propulsion system with a motor 3060 and a propeller 3065. In various embodiments of the present invention, the vertical propulsion frame 3040 and wing spars 3050 may be imbedded in the aircraft assembly 3000 and hidden from view. The vertical propulsion frame 3040 and wing spars 3050 are shown in FIG. 30 for clarity.

Figure 41:
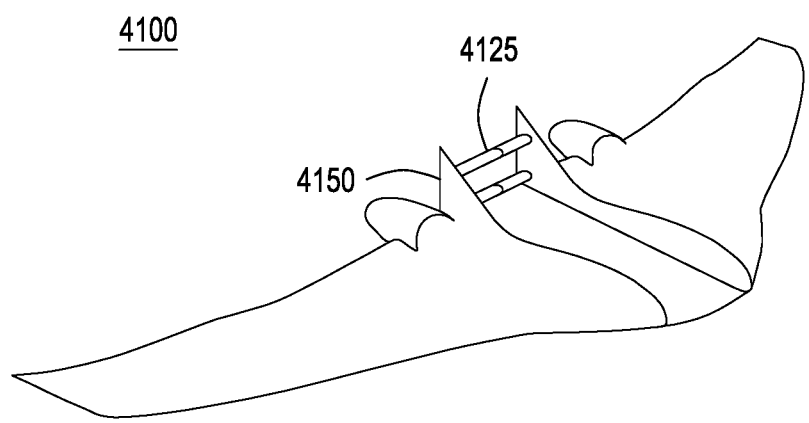
FIG. 41 shows a high level diagram of an aircraft assembly 4100 having a tail 4150 including a mounting system 4125 in accordance with an embodiment of the present invention.

In the embodiment of FIG. 30, the vertical propulsion frame 3040 is used to hold together the vertical thrusters 3030 and to transfer the vertical thrust produced by the vertical thrusters 3030 to the airframe of the aircraft assembly 3000. The rest of the airframe is mechanically supported by the wing spars 3050. In one embodiment of the present invention, the vertical propulsion frame 3040 is attached directly to the wing spars 3050. The horizontal propulsion system may be used to provide horizontal thrust to the airframe. In alternate embodiments of the present invention, other airframe components may be included in the VTOL aircraft assembly 3000, such as a payload bay (not shown), a fuselage (not shown), a tail (see 4150, FIG. 41), flight control surfaces (not shown), landing gears (not shown), additional motors and propellers (not shown), air vents (not shown), flight control systems (not shown), payloads (not shown) and others.

Figure 31:
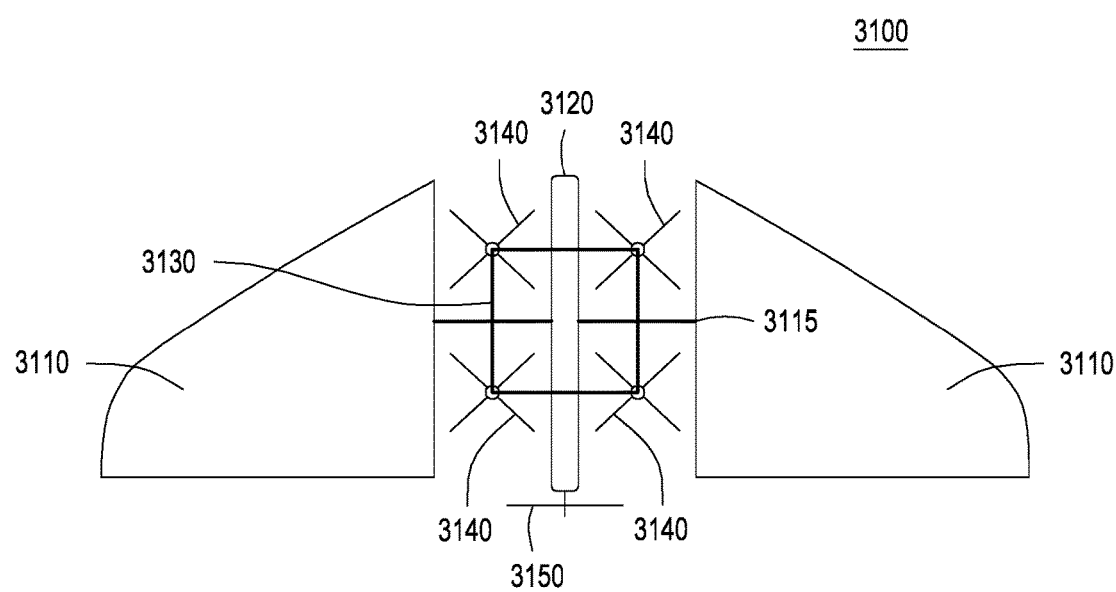
FIG. 31 shows a high level diagram of an aircraft assembly in accordance with an alternate embodiment of the present invention.

FIG. 31 shows a high level diagram of an aircraft assembly 3100 in accordance with an alternate embodiment of the present invention. The aircraft assembly 3100 of FIG. 31 includes wing portions, collectively 3110, a wing spar 3115, a fuselage 3120, a vertical propulsion frame 3130, vertical thrusters, collectively 3140, and a horizontal thruster 3150. In the embodiment of FIG. 31, the wing portions 3110 are sectioned into parts, so that the vertical propulsion frame 3130 may be inserted in a space between its sections as an alternative to wing openings. In this embodiment, the propulsion system is positioned between two halves of the wing portions 3110, which are held together by the wing spar 3115. In alternate embodiments of the present invention, the wing portions 3110 may be further subdivided into more sections with additional space for vertical thrusters and additional wing sections may be provided. Also, in alternate embodiments, additional flight control surfaces may be provided on the wing portions 3110 to control the horizontal flight path. Alternatively, the aircraft horizontal maneuvering may be controlled using the vertical thrusters.

Figure 32:
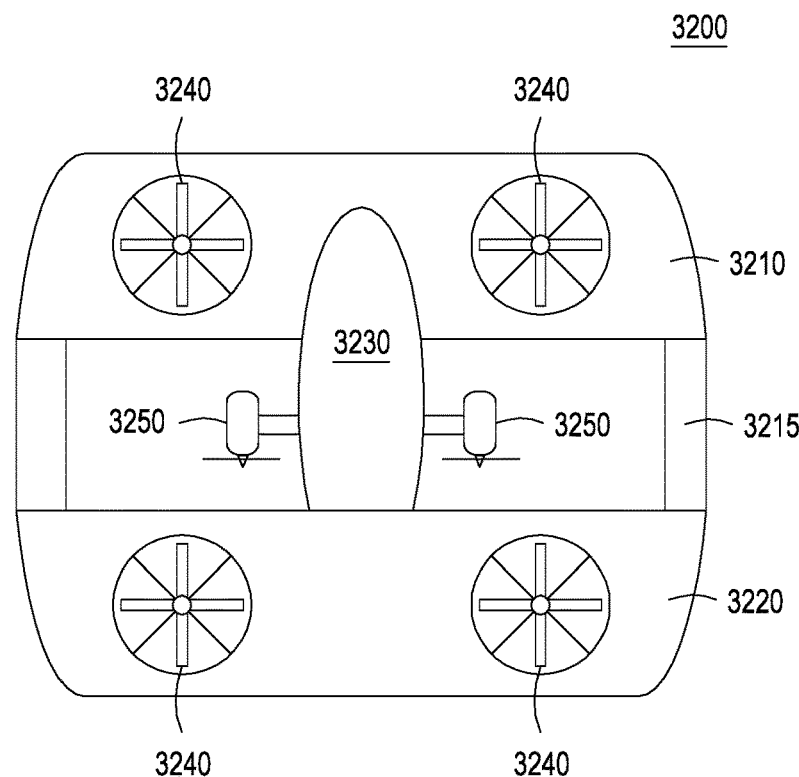
FIG. 32 shows a high level diagram of an aircraft assembly in accordance with an alternate embodiment of the present invention.

FIG. 32 shows a high level diagram of an aircraft assembly 3200 in accordance with an alternate embodiment of the present invention. The aircraft assembly 3200 of FIG. 32 includes a first wing assembly 3210, a second wing assembly 3220, a fuselage 3230, a vertical propulsion system, collectively 3240 and a horizontal propulsion system, collectively 3250. In the embodiment of FIG. 32, the vertical propulsion system 3240 includes four thrusters, while the horizontal propulsion system includes two thrusters. The first and second wing assemblies 3210 and 3220 may be connected by wing extensions 3215, thus producing a closed wing configuration. The aircraft assembly 3200 may also include landing gear (not shown) which enables the aircraft to land and move along the ground surface.

Figure 33:
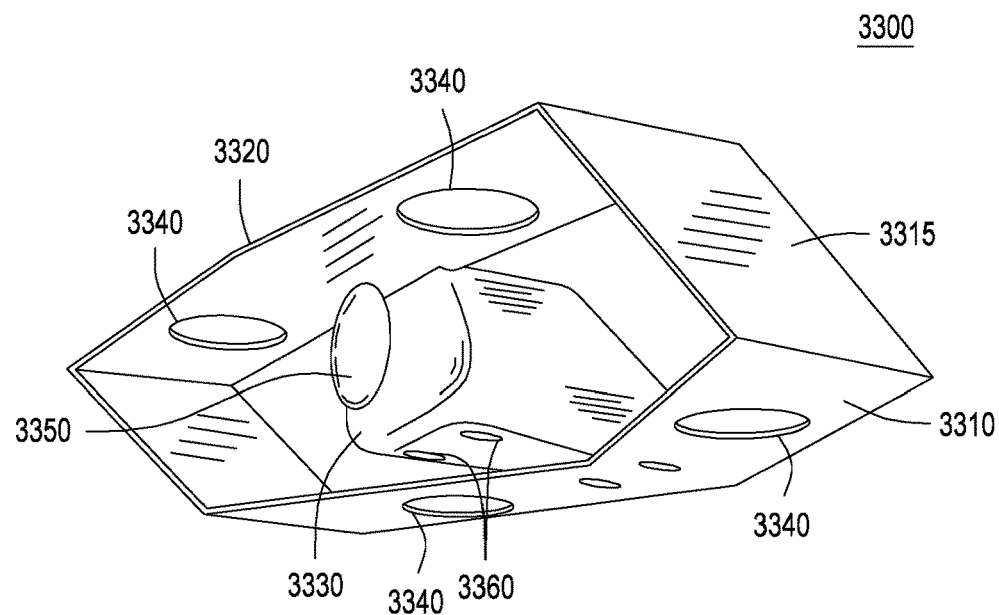
FIG. 33 shows a three-dimensional view of an aircraft assembly, such as the aircraft assembly of FIG. 32, in accordance with an embodiment of the present invention.

FIG. 33 shows a three-dimensional view of an aircraft assembly, such as the aircraft assembly 3200 of FIG. 32, in accordance with an embodiment of the present invention. Like the aircraft assembly 3200 of FIG. 32, the aircraft assembly 3300 of FIG. 33 also uses a closed wing configuration. However, instead of two horizontal propulsion motors and propellers as in the aircraft assembly 3200 of FIG. 32, a single motor with a propeller is used for horizontal propulsion in the aircraft assembly 3300 of FIG. 33. The aircraft assembly 3300 of FIG. 33 illustratively includes a first wing assembly 3310, a second wing assembly 3320, a fuselage 3330, a vertical propulsion system, collectively 3340, a horizontal propulsion system 3350 and landing gear 3360. The vertical propulsion system 3340 may include four thrusters (not shown), two in each wing, while the horizontal propulsion system may include one pusher propeller. In an alternate embodiment of the present invention, a pulling propeller in front of an aircraft assembly may be used for horizontal propulsion.

In the embodiment of FIG. 33, the front (first) and back (second) wing sections are staggered and located in different vertical planes. The wing sections form a closed wing configuration, where the front and back wing sections are connected by vertical wing extensions 3315 that may also serve as vertical stabilizers. The closed wing configuration improves the aerodynamic performance of an aircraft, however, in various embodiments of the present invention, the first and second wings do not have to be connected via the wing extensions and may form other wing configurations. For example, bi-plane and canard wing configurations may also be suitable for a VTOL aircraft assembly in accordance with embodiments of the present invention. In alternate embodiments of the present invention, additional wing portions and lift-producing surfaces may also be added for improved performance. In such embodiments, at least some part of wing portions and lift-producing surfaces may be mechanically flexible so that the wing may change shape if necessary as shown in the embodiment of FIG. 2. Alternatively or in addition, in various embodiments of the present principles one or both wings may be separable from the fuselage 3330, so that the fuselage 3330 or its parts may detached from the rest of the airframe and independently transported.

In accordance with embodiments of the present invention, the described VTOL aircraft of the present invention may be piloted and unpiloted. In the latter case, VTOL aircraft may be an unmanned airborne vehicle (UAV) with either an autonomous flight control system or a remotely controlled flight control system. Flight control systems may allow direct interactions with onboard passengers, such as providing destination requests, flight directions, alerts, communications and others. Flight control systems may allow direct interactions with onboard cargo, e.g. using electronic tags, machine-to-machine communications, and other cargo-embedded computer systems. Such a VTOL aircraft in general and VTOL UAV of the present invention in particular may be used for the automated transport of cargo and passengers, especially to and from locations that are inaccessible by other airborne aircraft. In addition to being used for transportation, a VTOL UAV in accordance with the present principles may be used for ground surveillance, weather monitoring, communications and many other applications.

In accordance with embodiments of the present invention, the described VTOL aircraft may be used for different flight modes. The flight modes may include different forms of vertical and horizontal transport. Vertical transport modes may include single and multiple aircraft modes. The vertical transport may also be classified into several categories of coordinated and uncoordinated vertical take-off and landing, as well as vertical descent and ascent. Similarly the horizontal transport modes may include individual (i.e. single aircraft) flight (i.e. outside of any flight formation) and multiple aircraft flight modes as described above. The latter may further include uncoordinated, partly coordinated and fully coordinated flight modes. In the uncoordinated flight mode, each aircraft may not have to coordinate its flight plan with any other aircraft or any flight authority. The safety of the aircraft may be ensured either by a pilot or an onboard collision-avoidance system (i.e. as a part of an auto-pilot onboard of a UAV). In the partly coordinated flight mode, each aircraft may have at least some awareness of its surroundings and capabilities to coordinate its flight pattern with other aircraft either directly or through a centralized flight controller. For example, transportation systems 1200 and 1300 shown in FIGS. 12 and 13 may also include aircraft travelling in the partly coordinated flight mode. In the fully coordinated flight mode, the flight pattern of each aircraft is tightly coordinated with other aircraft in the vicinity. For example, formation flight and close formation flight are examples of a fully coordinated flight mode.

In accordance with embodiments of the present invention, a VTOL aircraft may use various power sources, including gas, liquid and solid fuels, electrical batteries and supercapacitors, regenerative and non-regenerative fuel cells, renewable power sources, such as solar, thermal and wind energy, and others. Various power conversion mechanisms may be used onboard, such as electrical generation for mechanical-to-electrical transfer, solar photovoltaics for optical-to-electrical transfer, thermovoltaics for thermal-to-electrical, and so on. To expedite power transfer some power modules may be swappable. For example, a depleted battery may be swapped with a freshly charged one. In addition, various power transfer mechanism may be used to transfer energy to a VTOL aircraft, including airborne refueling and wireless power beaming using optical and radio frequency beams. In such an embodiment of the present invention, the VTOL aircraft may be equipped with a refueling beam, high-power optical receivers and RF antennas, respectively.

Figure 34:
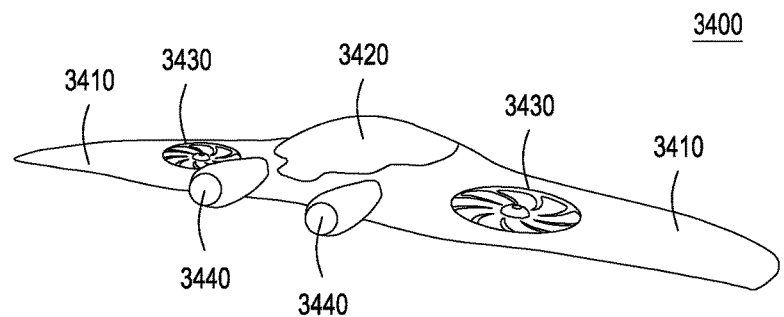
FIG. 34 shows a high level diagram of an aircraft assembly in accordance with an alternate embodiment of the present invention.

FIG. 34 shows a high level diagram of an aircraft assembly 3400 in accordance with an alternate embodiment of the present invention. The aircraft assembly 3400 of FIG. 34 illustratively includes wing portions, collectively 3410, a fuselage 3420, a vertical propulsion system, collectively 3430 and a horizontal propulsion system, collectively 3440. The fuselage 3420 may be configured to include a cockpit, a cargo compartment and/or a passenger cabin (not shown). As depicted in the embodiment of FIG. 34, the vertical propulsion system 3430 may include at least two thrusters, while the horizontal propulsion system 3440 may include two jet propulsion engines. In addition, in accordance with various embodiments of the present invention, the aircraft assembly 3400 may include other systems such as landing gear, vertical propulsion air vents, empennage, additional lifting surfaces, external pods and containers, external power systems such as solar photovoltaic modules and other systems (not shown). Furthermore, in various embodiments of the present invention, the aircraft assembly 3400 may include various sensors for flight control systems, including vortex sensors for enabling close formation flight (not shown). Vortex sensors may provide information to aircraft in a formation about the position of vortices produced by a leader aircraft in the formation, which in turn allows the flight control system to optimize the flight parameters of a follower aircraft for best flight performance.

Figure 35:
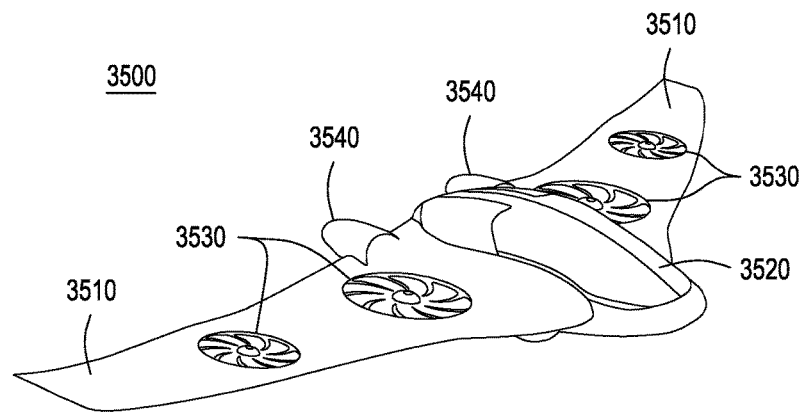
FIG. 35 shows a high level diagram of an aircraft assembly in accordance with an alternate embodiment of the present invention.

FIG. 35 shows a high level diagram of an aircraft assembly 3500 in accordance with an alternate embodiment of the present invention. The aircraft assembly 3500 of FIG. 35 includes wing portions, collectively 3510, a fuselage 3520, a vertical propulsion system, collectively 3530 and a horizontal propulsion system, collectively 3540. The fuselage 3520 may be configured to include a cockpit, a cargo compartment and/or a passenger cabin (not shown). As depicted in the embodiment of FIG. 35, the vertical propulsion system 3530 may include four thrusters, while the horizontal propulsion system 3540 may include two jet propulsion engines. In addition, the design of the fuselage 3520 may be modular, so that at least a section of or a whole fuselage 3520 may be separable and can be controllably separated from the rest of the airframe.

Figure 36:
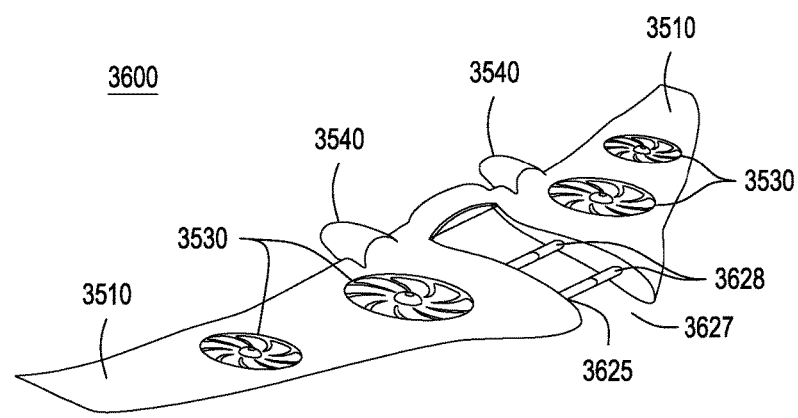
FIG. 36 shows a high level diagram of the aircraft assembly of FIG. 35 having a detached fuselage in accordance with an embodiment of the present principles.

FIG. 36 shows a high level diagram of an aircraft assembly, such as the aircraft assembly 3500 of FIG. 35, having a detached fuselage in accordance with an embodiment of the present principles. The aircraft assembly 3600 of FIG. 36 depicts the wing portions 3510 of the aircraft assembly 3500 of FIG. 35, a mounting system 3625 for a fuselage or a section of a fuselage and the vertical propulsion system 3530 and the horizontal propulsion system 3540 of the aircraft assembly 3500 of FIG. 35. As depicted in FIG. 36, the mounting system 3625 can include an open frame 3627, having therein attachment/support members, collectively members 3628. Illustratively in FIG. 36, the attachment/support members are depicted as cylindrical structures, such as struts, for attaching a fuselage and/or pod within the open frame 3627 in the aircraft assembly 3600 and for providing structural support for the frame of the aircraft assembly 3600 when the fuselage and/or pod is detached. Similar to the aircraft assembly 3500 of FIG. 35, the aircraft assembly 3600 of FIG. 36 may be an autonomously or remotely piloted aircraft and thus include a flight control system (not shown) with autonomous flight capabilities (e.g., an auto-pilot system). Additional capabilities of the aircraft assembly 3600 may include the ability to locate and mount a fuselage or a section of a fuselage onto its mounting system 3625. This can be achieved for example during the vertical descent of the aircraft assembly 3600 while the fuselage or its section is positioned on the ground.

Figure 37:
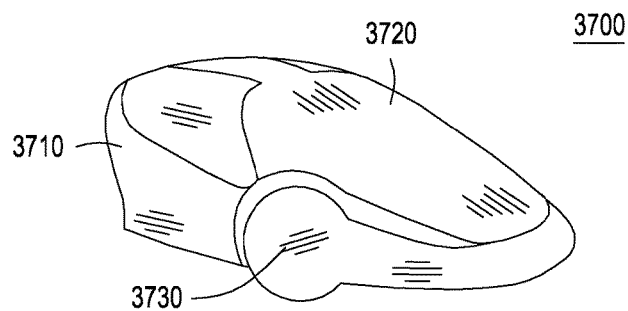
FIG. 37 shows a high level diagram of a cargo pod in accordance with an embodiment of the present principles.

FIG. 37 shows a high level diagram of a cargo pod (or similarly an HO pod) 3700 in accordance with an embodiment of the present principles. The cargo pod 3700 of FIG. 37 can be attached to the aircraft 3600 as a part of its fuselage using the mounting system 3625. As depicted in FIG. 37, the cargo pod 3700 may include a pod frame 3710, a cabin 3720 and a ground transport system 3730. The cabin 3720 may be used to transport cargo and passengers. The ground transport system 3730 may include wheels and powertrain (not shown) providing the capabilities to drive the cargo pod 3700 on the ground surface. In accordance with various embodiments of the present invention, the ground transport system 3730 may be driven by a passenger, remotely or autonomously using an autonomous driving computer system (not shown) on board the cargo pod 3700. In various embodiments, the ground transport system 3730 may also be separable from the rest of the cargo pod 3700, so that it can separate and remain on the ground after the cargo pod 3700 is mounted onto an aircraft assembly in accordance with the present principles.

Figure 38:
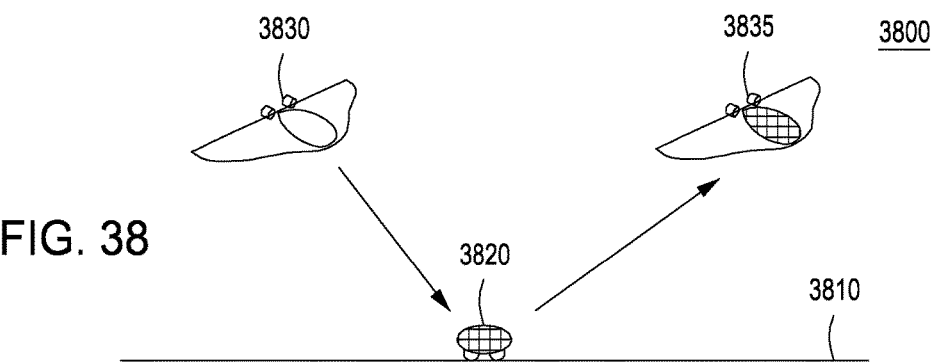
FIG. 38 shows schematically an example of a loading method in accordance with an alternate embodiment of present invention.

FIG. 38 shows a high level schematic diagram of a loading method 3800 in accordance with an embodiment of present invention. The loading method 3800 of FIG. 38 depicts an example of using an aircraft like the aircraft assembly 3600 of FIG. 36 and a cargo pod like the cargo pod 3700 of FIG. 37 in accordance with embodiments of the present invention. The loading method 3800 of FIG. 38 can be considered as a modified loading method of FIG. 6. In the embodiment of a loading method 3800 of FIG. 38, an area on the ground 3810 is used to locate a cargo pod 3820 using a VTOL aircraft 3830 of embodiments of the present invention. In the embodiment of FIG. 38, different ground transportation means may be used to transport the cargo pod 3820 on the ground before loading and mounting to an aircraft assembly of the present invention. Such ground transportation means may include built-in means (e.g., self-propulsion) and assisted means (e.g. specialized ground transport vehicles for cargo pods). In accordance with various embodiments of the present invention, before landing and loading, the VTOL aircraft 3830 may have an open bay area (not shown) in its fuselage mounting system. Upon landing or while hovering in a stable position above the cargo pod 3820, the VTOL aircraft 3830 may attach the pod to its mounting frame as a part of its fuselage and assume a new aircraft configuration 3835, in which the cargo pod 3820 is now a part of the VTOL aircraft and in one embodiment part of its fuselage. In alternate embodiments of the present invention, other mounting approaches in differently situated bay areas on an aircraft assembly of the present invention may be implemented using the loading method 3800 of FIG. 38.

Figure 39:
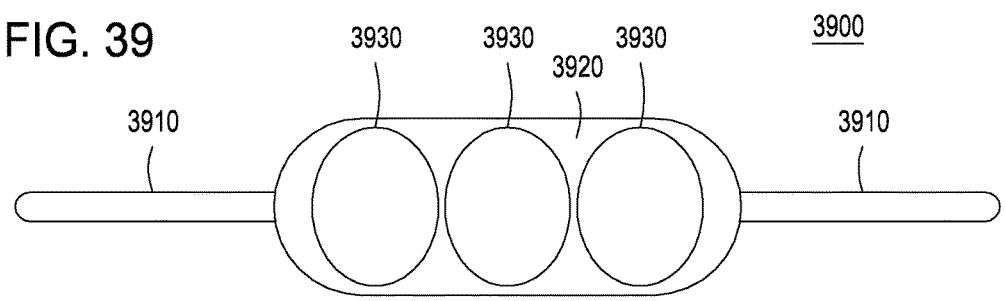
FIG. 39 shows a high level diagram of an aircraft assembly in accordance with an alternate embodiment of the present invention.

FIG. 39 shows a high level diagram of an aircraft assembly 3900 in accordance with an alternate embodiment of the present invention. The aircraft assembly 3900 of FIG. 39 includes wing portions, collectively 3910, a fuselage frame 3920 and cargo pods, collectively 3930. In the embodiment of FIG. 39, the cargo pods 3930 may be loaded and unloaded individually and independently from each other, so that different cargo and passengers may be loaded and unloaded at several different locations. In addition, cargo pods may be loaded into other parts of the aircraft assembly 3900, such as wings and tails (see 4150, FIG. 41), and attached as stand-alone units to a fuselage, wings or a tail 4150 using, for example, a mounting system (see 4125, FIG. 41) in accordance with an embodiment of the present invention. In accordance with the present invention, an aircraft fuselage may be segmented into multiple sections and thus contain multiple cargo pods.

While the foregoing is directed to embodiments of the present invention, other and further embodiments of the invention may be devised without departing from the basic scope thereof.

The invention claimed is:

1. An aircraft for vertical take-off and landing, comprising:
   at least one first wing portion providing a lift force during a horizontal flight;
   at least one wing opening disposed on a vertical axis of the at least one first wing portion;
   at least one vertical thruster positioned inside the at least one wing opening to provide vertical thrust during a vertical flight;
   at least one pod, wherein the at least one pod comprises a mounting frame and a cabin to contain at least one of cargo and passengers, and wherein the at least one pod is separable from the aircraft; and
   a mounting system including an open frame portion in a frame of the aircraft and at least one stationary attachment member disposed across the open frame portion configured to attach the at least one pod to the open frame portion in the aircraft frame.

2. The aircraft of claim 1, wherein the at least one pod further comprises a ground transport system.

3. The aircraft of claim 2, wherein the ground transport system is separable from the at least one pod.

4. The aircraft of claim 2, wherein the ground transport system further comprises wheels and a powertrain.

5. The aircraft of claim 2, wherein the ground transport system is an autonomously controlled system.

6. The aircraft of claim 1, wherein the at least one attachment member of the mounting system further provides structural support to the aircraft frame when the pod is detached.

7. The aircraft of claim 1, wherein the mounting system is a part of the at least one first wing portion.

8. The aircraft of claim 1, further comprising a tail, wherein the mounting system is a part of the tail.

9. The aircraft of claim 1, further comprising a fuselage, wherein the mounting system is a part of the fuselage.

10. The aircraft of claim 9, wherein the fuselage is segmented into a plurality of sections each containing a mounting system.

11. The aircraft of claim 1, wherein the at least one pod comprises multiple pods.

12. The aircraft of claim 1, further comprising a flight control system wherein the flight control system provides and performs a method for mounting the at least one pod onto the aircraft.

13. The aircraft of claim 1, wherein the at least one vertical thruster is one of a jet propulsion thruster or a propeller-based thruster including a propeller.

14. The aircraft of claim 1, further comprising a horizontal propulsion system.

15. The aircraft of claim 14, wherein the horizontal propulsion system comprises at least one horizontal thruster positioned along a horizontal axis of the aircraft for providing horizontal thrust during flight.

16. The aircraft of claim 15, wherein the aircraft is configured to fly vertically using vertical thrust provided by the at least one vertical thrusters and to fly horizontally using horizontal thrust provided by the at least one horizontal thruster and the lift force of the at least one first wing portion.

17. The aircraft of claim 15, comprising a flight control system providing independent and synchronous flight control capabilities for the at least one vertical and the at least one horizontal thrusters.

18. The aircraft of claim 1, further comprising air vents positioned inside at least one of the at least one wing opening.

19. The aircraft of claim 17, wherein the air vents comprise louvres positioned inside the at least one wing opening to close the opening during flight.

20. The aircraft of claim 19, wherein the closed area of the at least one wing opening provides a lift force during horizontal flight.

21. The aircraft of claim 1, wherein the at least one first wing portion comprises a foldable section and the foldable section can be folded to reduce wingspan.

22. The aircraft of claim 1, wherein the at least one vertical thruster has the ability to provide control of at least one of pitch, roll, or yaw during flight.

23. The aircraft of claim 1, comprising a plurality of wing openings and respective vertical thrusters positioned in the plurality of wing openings, wherein the respective vertical thrusters are individually controlled to provide control of at least one of pitch, roll, or yaw for the aircraft.

24. The aircraft of claim 23, wherein a thrust of the respective vertical thrusters can be controlled individually.

25. The aircraft of claim 1, further comprising an autonomous flight control system.

26. An aircraft for vertical take-off and landing, comprising:
   a first wing providing a lift force during a horizontal flight;
   a plurality of wing openings;

at least one horizontal thruster to provide horizontal thrust;

at least one propeller-based vertical thruster positioned inside at least one of the plurality of wing openings to provide vertical thrust during a vertical flight;

wherein at least one propeller of the at least one propeller-based vertical thruster is configured to auto-rotate and produce a lift force during horizontal flight;

at least one pod, wherein the at least one pod comprises a mounting frame and a cabin to contain at least one of cargo and passengers, and wherein the at least one pod is separable from the aircraft; and a mounting system including an open frame portion in a frame of the aircraft and at least one stationary attachment member disposed across the open frame portion configured to attach the at least one pod to the open frame portion in the aircraft frame.

27. The aircraft of claim 26, wherein the aircraft is configured to fly vertically using vertical thrust provided by the at least one propeller-based vertical thruster and to fly horizontally using horizontal thrust provided by the at least one horizontal thruster and the lift force of the first wing and the auto-rotating at least one propeller-based vertical thruster.

28. An aircraft for vertical take-off and landing, comprising:

at least one first wing portion providing a lift force during a horizontal flight;

at least one wing opening disposed on a vertical axis of the at least one first wing portion;

at least one vertical thruster positioned inside the at least one wing opening to provide vertical thrust during a vertical flight;

wherein the at least one vertical thruster provides roll, pitch, and yaw control during a horizontal flight;

a mounting system including an open frame portion in a frame of the aircraft and at least one stationary attachment member disposed across the open frame portion configured to attach at least one pod to the open frame portion in the aircraft frame; and at least one pod, comprising;
    a mounting frame to attach the at least one pod to the mounting system;
    a cabin to contain at least one of cargo and passengers; and
    a ground transport system including wheels and a powertrain.

29. The aircraft of claim 28, wherein the aircraft is configured to fly vertically using vertical thrust provided by the at least one vertical thruster to fly horizontally using horizontal thrust provided by at least one horizontal thruster and the lift force of the first wing, and to control the direction of the horizontal flight using the at least one vertical thruster.

* * * * *